(12) United States Patent
Kim et al.

(10) Patent No.: US 8,970,570 B2
(45) Date of Patent: *Mar. 3, 2015

(54) DISPLAY DEVICE AND METHOD FOR OPERATING THE DISPLAY DEVICE

(71) Applicant: Samsung Display Co., Ltd., Yongin, Gyeonggi-do (KR)

(72) Inventors: Kang-Min Kim, Seoul (KR); Kwan-Ho Kim, Yongin-si (KR); Ryota Odake, Hwaseong-si (KR); Sang Min Jeon, Yongin-si (KR); Seon Ki Kim, Anyang-si (KR); Jin Hwan Kim, Suwon-si (KR); Tae Hyung Kim, Anyang-si (KR); A Ram Song, Suwon-si (KR); Seung Jun Yu, Suwon-si (KR); Jae Woo Jung, Cheonan-si (KR); Jung-Hyun Cho, Suwon-si (KR)

(73) Assignee: Samsung Display Co., Ltd. (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/461,267

(22) Filed: Aug. 15, 2014

(65) Prior Publication Data
US 2014/0354613 A1 Dec. 4, 2014

Related U.S. Application Data

(63) Continuation of application No. 13/663,357, filed on Oct. 29, 2012, now Pat. No. 8,842,107.

(30) Foreign Application Priority Data

Jul. 17, 2012 (KR) .................. 10-2012-0077802

(51) Int. Cl.
*G06F 3/038* (2013.01)
*G09G 5/00* (2006.01)
*G09G 3/30* (2006.01)

(52) U.S. Cl.
CPC .......... *G09G 3/30* (2013.01); *G09G 2310/0275* (2013.01)
USPC .......................................... 345/204; 345/690

(58) Field of Classification Search
USPC .......................................... 345/204, 690, 156
See application file for complete search history.

(56) References Cited

U.S. PATENT DOCUMENTS 7,567,307 B2   7/2009   Kim et al.
7,697,203 B2   4/2010   Cha et al.
(Continued)

FOREIGN PATENT DOCUMENTS

JP   10-063410   3/1998
JP   11-003429   1/1999
(Continued)

*Primary Examiner* — Ricardo L Osorio
(74) *Attorney, Agent, or Firm* — Innovation Counsel LLP

(57) ABSTRACT

A display device includes a display panel configured to receive a first-frame image signal for displaying a first-frame image in a first frame. The display panel is further configured to receive a second-frame image signal for displaying a second-frame image in a second frame that immediately follows the first frame such that the display panel appears to display a transition region associated with a boundary between a portion of the first-frame image and a portion of the second-frame image and moving in a moving direction. The display device further includes an optical effect layer and electrode sets. The electrode sets respectively overlap different portions of the optical effect layer and are configured for sequentially starting affecting the different portions of the optical effect layer such that the optical effect layer appears to display a light-blocking section that moves in the moving direction and overlaps the transition region.

21 Claims, 21 Drawing Sheets

(56) References Cited

U.S. PATENT DOCUMENTS

| | | |
|---|---|---|
| 7,825,999 B2 | 11/2010 | Chestak et al. |
| 8,040,307 B2 | 10/2011 | Kim et al. |
| 8,040,371 B2 | 10/2011 | Kim et al. |
| 2007/0242068 A1 | 10/2007 | Han et al. |
| 2008/0169997 A1 | 7/2008 | Choi |
| 2008/0231952 A1 | 9/2008 | Kim |
| 2010/0039573 A1 | 2/2010 | Park et al. |
| 2010/0194866 A1 | 8/2010 | Komiya |
| 2011/0043713 A1 | 2/2011 | Nam et al. |
| 2012/0001956 A1 | 1/2012 | Sato |
| 2013/0088466 A1 | 4/2013 | Odake |

FOREIGN PATENT DOCUMENTS

| | | |
|---|---|---|
| JP | 2011-053277 | 3/2011 |
| JP | 2011-209346 | 10/2011 |
| KR | 10-0887673 | 3/2009 |
| KR | 10-2011-0128018 | 11/2011 |
| KR | 10-1120581 | 2/2012 |
| KR | 10-2013-0037861 | 4/2013 |

FIG. 10
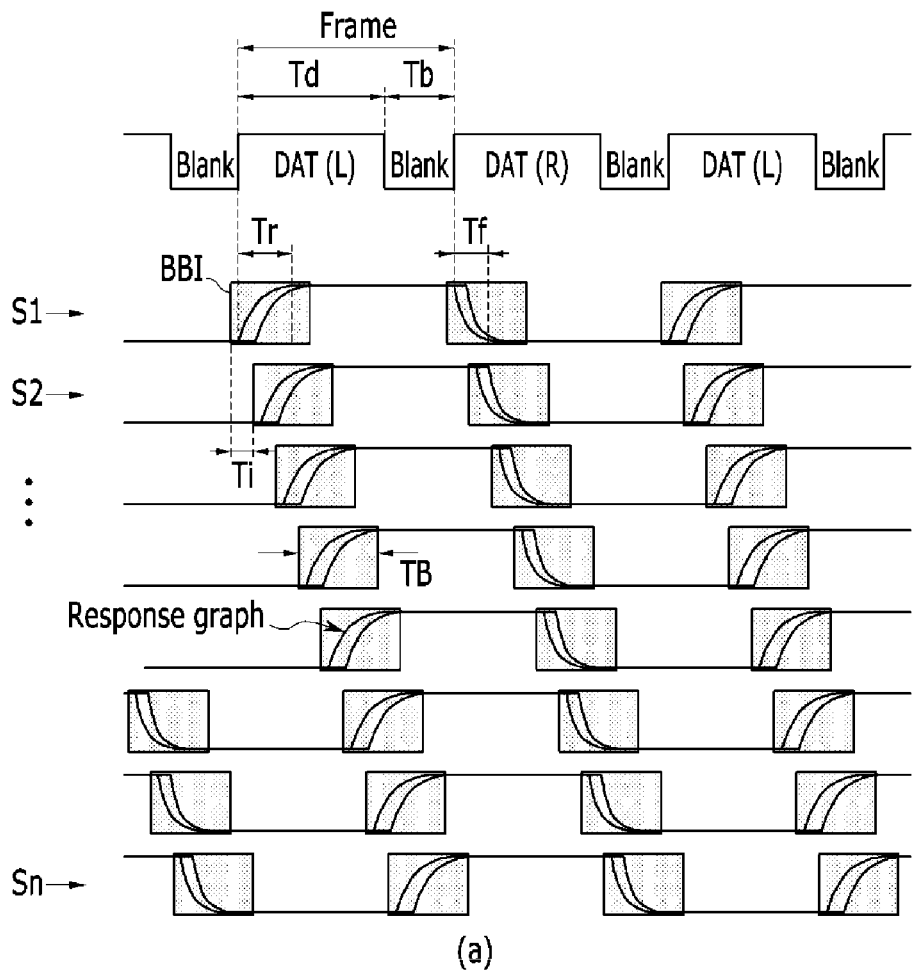
(a)
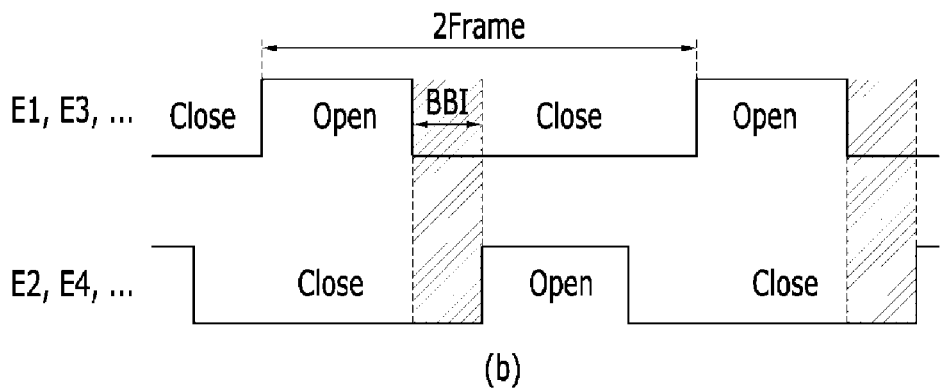
(b)

FIG. 20
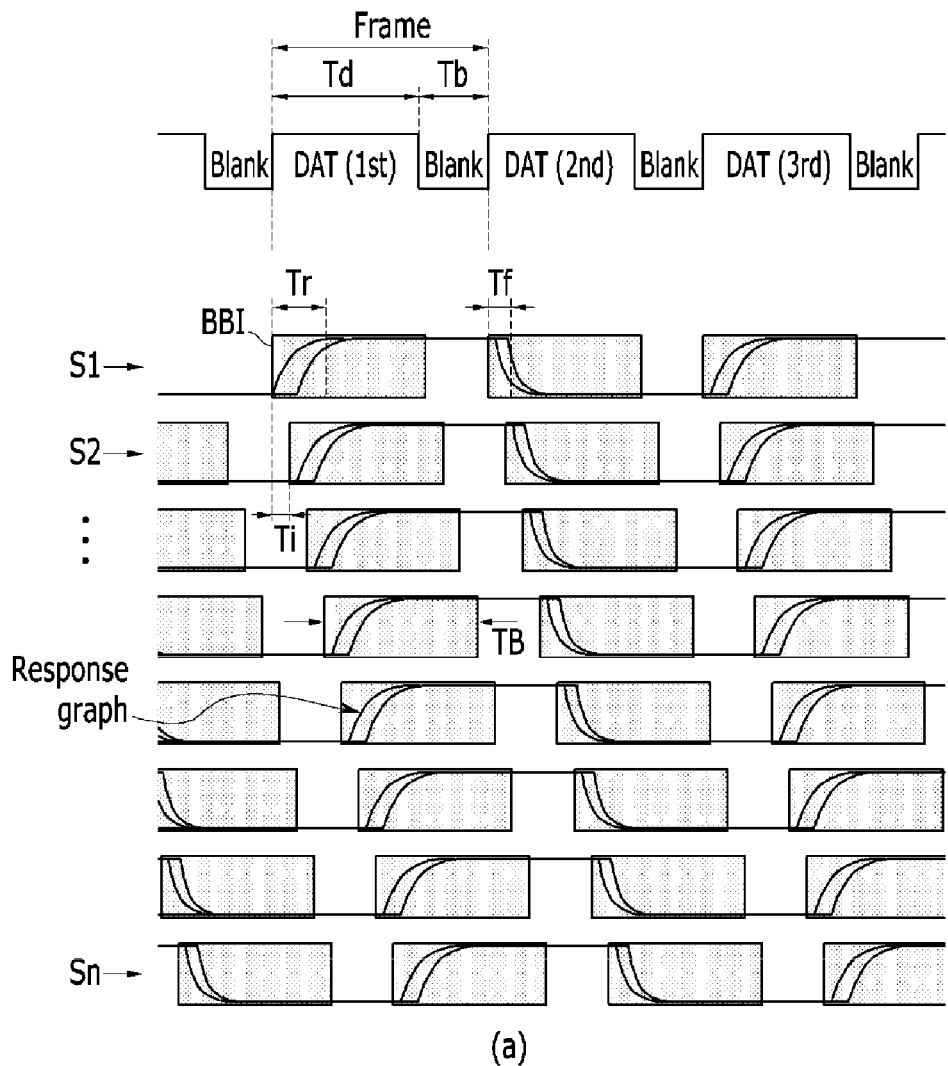
(a)
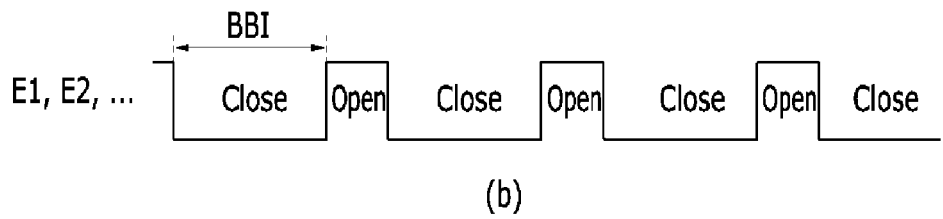
(b)

DISPLAY DEVICE AND METHOD FOR OPERATING THE DISPLAY DEVICE

CROSS-REFERENCE TO RELATED APPLICATION

This application is a continuation application of U.S. patent application Ser. No. 13/663,357 filed Oct. 29, 2012, which claims priority to and the benefit of Korean Patent Application No. 10-2012-0077802 filed in the Korean Intellectual Property Office on Jul. 17, 2012, the entire contents of which are incorporated herein by reference.

BACKGROUND OF THE INVENTION (a) Field of the Invention

The present invention relates to a display device and a method for driving the display device.

(b) Description of the Related Art

A display device may include a plurality of pixels for displaying an image, a plurality of display signal lines connected to a switching element included in a pixel, a gate driver applying a gate-on voltage and a gate-off voltage to a gate line of the display signal lines to turn-on/off the switching element of the pixel, and a data driver applying a data voltage to a data line of the display signal lines to apply the data voltage to the pixel through the turned-on switching element.

For example, the display device may represent a liquid crystal display (LCD), an organic light emitting diode display (OLED display), or an electrophoretic display.

Each pixel of the display device further includes a pixel electrode for receiving the data voltage through the switching element and an electric optical active layer for converting the data voltage into an optical signal suitable for displaying the image. A liquid crystal display may include a liquid crystal layer as the electric optical active layer; an organic light emitting diode display may include an organic emission layer as the electric optical active layer; an electrophoretic display may include particles having charges.

With technical advancement in the display device field, display devices capable of displaying three-dimensional (3D) images and related methods have been implemented.

In general, a 3D image display device may provide 3D effects of objects using binocular parallax. Based on binocular parallax, when different 2-dimensional images are reflected in a left eye and a right eye, respectively, and the image reflected in the left eye (hereinafter, referred to as a "left eye image") and the image reflected in the right eye (hereinafter, referred to as a "right eye image") are transmitted to a brain, the left eye image and the right eye image are fused in the brain to be recognized as a 3D image having depth perception or 3D effects.

A display devices that can display 3D images may be classified into stereoscopic type 3D image display devices (which use glasses such as shutter glasses, polarized glasses, or other auxiliary glasses to be worn by the user) and autostereoscopic type 3D image display devices (which may include a lenticular lens and a parallax barrier without requiring glasses to be worn by the user).

A display device may display different images for different frames. When the images for adjacent frames are different from each other, if the response speed of the electric optical active layer (e.g., a liquid crystal layer) is not sufficiently high, the images for the adjacent frames may be seen at the same time and accordingly may be blurred and unclear. The phenomenon is called a crosstalk. Particularly, in the case where a motion picture is displayed, blurring may increase due to crosstalk.

A 3D image display device may alternately display a left eye image and a right eye image in adjacent frames. Insufficient response speed of the electric optical active layer may cause substantial crosstalk, which may substantially deteriorate display quality.

The above information disclosed in this Background section is only for enhancement of understanding of the background of the invention. The Background section may contain information that does not form the prior art that is already known in this country to a person of ordinary skill in the art.

SUMMARY OF THE INVENTION

Embodiments of the present invention may substantially minimize crosstalk, thereby advantageously providing satisfactory display quality.

One or more embodiments of the invention may be related to a display device that may include a display panel configured to receive a first-frame image signal for displaying a first-frame image in a first frame. The display panel may be further configured to receive a second-frame image signal for displaying a second-frame image in a second frame that immediately follows the first frame such that the display panel may appear to display a transition region that is associated with a boundary between at least a portion of the first-frame image and at least a portion of the second-frame image and moves in a moving direction. The display device may further include an optical effect layer including optical effect elements (e.g., liquid crystal molecules). The display device may further include a plurality of electrode sets. The electrode sets may respectively overlap different portions of the optical effect layer. The electrode sets may be configured for respectively and sequentially starting affecting the different portions of the optical effect layer (at different times) such that the optical effect layer may appear to display a light-blocking barrier section that moves in the moving direction and overlaps the transition region.

In one or more embodiments, the display panel may include a gate line for transmitting a gate signal. Each of the electrode sets may overlap one of the different portions of the optical effect layer and may include a row electrode that is parallel to the gate line.

In one or more embodiments, each of the electrode sets may overlap one of the different portions of the optical effect layer and may include a plurality of electrodes.

In one or more embodiments, the electrode sets may include a first electrode set configured to start affecting a first portion of the optical effect layer at a first time. The electrode sets may further include a second electrode set configured to start affecting a second portion of the optical effect layer at a second time. A difference between the second time and the first time may be at least 0.5 ms.

In one or more embodiments, the display panel may be configured to receive the first-frame image signal for an image signal input time duration. The electrode sets may include a first electrode set configured for starting affecting a first portion of the optical effect layer at a first time. The electrode sets may further include a second electrode set configured for starting affecting a second portion of the optical effect layer at a second time. A difference between the second time and the first time may be equal to or greater than a value resulted from dividing the image signal input time duration by the total number of electrode sets in the plurality of electrode sets.

In one or more embodiments, the display panel may be configured to start receiving the first-frame image signal at a first start time. The display panel may be configured to stop receiving the first-frame image signal at a first stop time. The display panel may be configured to start receiving the second-frame image signal at a second start time. A difference between the second start time and the first stop time may be at least 30% of the first frame.

In one or more embodiments, the electrode sets may include a first electrode set configured to affect a first portion of the optical effect layer. The first portion may be configured to be affected by a first voltage in the first frame. The first portion may be configured to be affected by a second voltage in the second frame. A polarity of the second voltage is opposite to a polarity of the first voltage.

In one or more embodiments, the display panel may be further configured to display a third-frame image in a third frame that immediately follows the second frame. The first portion may be configured to be affected by a third voltage in the third frame. A polarity of the third voltage may be the same as the polarity of the second voltage.

In one or more embodiments, the display panel may be further configured to display a fourth-frame image in a fourth frame that immediately follows the third frame. The first portion may be configured to be affected by a fourth voltage in the fourth frame. A polarity of the fourth voltage may be opposite to the polarity of the third voltage.

In one or more embodiments, the electrode sets may include a first electrode set configured to affect a first portion of the optical effect layer. The first electrode set may be configured to receive a first voltage and a second voltage in the first frame, the first voltage having a first value, the second voltage having a second value. The first electrode set may be configured to receive a third voltage and a fourth voltage in the second frame, the third voltage having a third value, the fourth voltage having a fourth value. The first value, the second value, the third value, and the fourth value may be different from each other.

In one or more embodiments, the electrode sets may include a first electrode set configured to affect a first portion of the optical effect layer. The first electrode set may be configured to receive a first voltage and a second voltage in the first frame, the first voltage having a first value, the second voltage having a second value. The first electrode set may be configured to receive a third voltage and a fourth voltage in the second frame, the third voltage having a third value, the fourth voltage having the second value. The first value, the second value, and the third value may be different from each other.

In one or more embodiments, the plurality of electrode sets may be a plurality of row electrode sets. The display device may further include a plurality of column electrode sets. The optical effect layer may be disposed between the plurality of row electrode sets and the plurality of column electrode sets. The row electrode sets may be substantially perpendicular to the column electrode sets in a plan view of the display device.

In one or more embodiments, the plurality of column electrode sets may include a first group of column electrode sets (e.g., a plurality of odd-numbered column electrode sets) and a second group of column electrode sets (e.g., a plurality of even-numbered column electrode sets). Column electrode sets of the first group of column electrode sets (e.g., the odd-numbered column electrode sets) and column electrode sets of the second group of electrode sets (e.g., the even-numbered column electrode sets) may be alternately disposed. The first group of column electrode sets may be configured to receive a first voltage in the first frame, the first voltage having a first value. The second group of column electrode sets may be configured to receive a second voltage in the first frame, the second voltage having a second value. The second value may be different from the first value.

In one or more embodiments, the first group of column electrode sets may be configured to receive the first voltage in the second frame. The second group of column electrode sets may be configured to receive the second voltage in the second frame.

In one or more embodiments, the first group of column electrode sets may be configured to receive a third voltage in a third frame that immediately follows the second frame, the third voltage having the second value. The second group of column electrode sets may be configured to receive a fourth voltage in the third frame, the fourth voltage having the first value.

In one or more embodiments, the first group of column electrode sets may be configured to receive the third voltage in a fourth frame that immediately follows the third frame. The second group of column electrode sets may be configured to receive the fourth voltage in the fourth frame.

In one or more embodiments, display device may include a backlight unit. The optical effect layer may be disposed between the backlight unit and the display panel.

In one or more embodiments, the display device may include a lens set that includes a plurality of convex lenses. The convex lenses (which may extend in a column direction) may be substantially perpendicular to the electrode sets (which may extend in a row direction) in a plan view of the display device. The optical effect layer may be disposed between the backlight unit and the lens set.

In one or more embodiments, the display device may include a shutter member. A duration of the light-blocking barrier section may overlap a switching time of the shutter member. The switching time of the shutter member m associated with a change between a closed state of the shutter member and an open state of the shutter member.

One or more embodiments may be related to method for operating a display device. The method may include providing a first-frame image signal to a display panel for displaying a first-frame image in a first frame. The method may further include providing a second-frame image signal to the display panel for displaying a second-frame image in a second frame that immediately follows the first frame such that the display panel may appear to display a transition region that is associated with a boundary between at least a portion of the first-frame image and at least a portion of the second-frame image and moves in a moving direction. The method may further include using a plurality of electrode sets to sequentially start affecting different portions of an optical effect layer such that the optical effect layer may appear to display a light-blocking barrier section that moves in the moving direction and overlaps the transition region, wherein the electrode sets respectively overlap different portions of the optical effect layer.

One or more embodiments of the present invention may be related to a display device that may include the following elements: a display panel including a plurality of pixels arranged in a first direction (e.g., a row direction) and a second direction (e.g., a column direction) that is substantially vertical to the first direction, a display panel driver for scanning (i.e., sequentially providing) an image signal of one frame in the second direction to input the image signal to the plurality of pixels, a barrier including a first electrode portion and a second electrode portion facing each other and overlapping the display panel, and a barrier driver for driving the barrier, wherein the second electrode portion includes a plurality of second electrodes (e.g., row electrodes) each extending in the first direction and arranged along the second direction, and the barrier driver may drive the barrier so that the barrier includes a barrier black section (or light-blocking section) that corresponds to a frame boundary (between at least a portion of a first-frame image for a first frame and at least a portion of a second-frame image for a second frame immediately following the first frame) and is scanned (or appears to move) in the second direction.

A scanning interval of the barrier black section may be less than about 0.5 ms.

A vertical blank period may be positioned between input periods of the image signals of two adjacent frames, and a duration time of the vertical blank period may be about 30% or more of one frame.

The barrier black section may correspond to one or more adjacent second electrodes (e.g., adjacent row electrodes) of the plurality of second electrodes (e.g., row electrodes).

A polarity of a voltage difference between a second electrode displaying the barrier black section and the first electrode portion may be reversed for every frame.

The first electrode portion may include a plurality of first electrodes each extending in the second direction and arranged in the first direction, and the barrier may include a blocking region and a transmitting region alternately arranged in the first direction.

The barrier may be positioned between the display panel and an observer, the display panel may display a left eye image and a right eye image alternately in the first direction, and when the barrier is divided into a first region and a second region with respect to the barrier black section, arrangement of the blocking region and the transmitting region in the first region may be opposite to the arrangement of the blocking region and the transmitting region in the second region.

A voltage applied to an even numbered first electrode of the plurality of first electrodes may have a waveform that is reversed to a waveform of a voltage applied to an odd numbered first electrode.

A number of levels of a voltage applied to the second electrode may be four or more.

A voltage difference between a voltage applied to an even numbered first electrode among the first electrodes overlapping the second electrode displaying the barrier black section and a voltage applied to the second electrode displaying the barrier black section and a voltage difference between a voltage applied to an odd numbered first electrode among the first electrodes overlapping the second electrode displaying the barrier black section and a voltage applied to the second electrode displaying the barrier black section may be different from each other.

The display device may further include the following elements: a backlight for providing light to the display panel, and a lens positioned between the backlight and the display panel, wherein the barrier may be positioned between the lens and the backlight, the display panel may display a right eye image in the first frame and displays a left eye image in the second frame, and the barrier and the lens may steer light of the backlight toward the right eye of an observer in the first frame, and may steer light of the backlight toward the left eye of the observer in the second frame.

A voltage applied to the first electrode portion may be constant, and a number of levels of a voltage applied to the second electrode (e.g., row electrode) may be three.

The display device may further comprise the following elements: a shutter member that can alternately block a left eye and a right eye of an observer, wherein the barrier may be positioned between the display panel and the observer, and the display panel may display a right eye image in the first frame and may display a left eye image in the second frame.

An entire region of the barrier may correspond to the barrier black section during a switching time in which a on-off state of a shutter included in the shutter member is changed.

The barrier may be positioned between the display panel and the observer, and the display panel may display a 2-dimensional image.

One or more embodiments of the present invention may be related to a driving method of a display device that includes a display panel including a plurality of pixels arranged in a first direction and a second direction that is substantially vertical to the first direction and a barrier overlapping the display panel. The method may include the following steps: after displaying an image of a first frame, displaying an image of a second frame that is next to the first frame in the plurality of pixels by scanning in the second direction, wherein the barrier may display a barrier black section which corresponds to a frame boundary (between at least a portion of a first-frame image for a first frame and at least a portion of a second-frame image for a second frame immediately following the first frame) and is scanned (or appears to move) in the second direction.

The barrier may include a first electrode portion and a second electrode portion facing each other, and the second electrode portion may include a plurality of second electrodes (e.g., row electrodes) each extending in the first direction and arranged along the second direction.

A scanning interval of the barrier black section may be less than about 0.5 ms.

A vertical blank period may be positioned between input periods of the image signals of two adjacent frames, and a duration time of the vertical blank period may be about 30% or more of one frame.

A polarity of a voltage difference between a second electrode displaying the barrier black section and the first electrode portion may be reversed for every frame.

According to one or more embodiments of the present invention, with minimum perceivable crosstalk and minimum backlight turn-off, substantially satisfactory display quality and substantially satisfactory image luminance may be provided by a display device when the display device is displaying a 2-dimensional image or a 3D image.

BRIEF DESCRIPTION OF THE DRAWINGS

FIG. 10 includes timing views illustrating a driving method of a display device according to one or more embodiments of the present invention.

FIG. 20 is a timing view illustrating a driving method of a display device according to one or more embodiments of the present invention.

DETAILED DESCRIPTION OF THE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Various embodiments are described herein below, including methods and techniques. It should be kept in mind that the invention might also cover an article of manufacture that includes a non-transitory computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to embodiments of the invention.

Although the terms first, second, third etc. may be used herein to describe various signals, elements, components, regions, layers, and/or sections, these signals, elements, components, regions, layers, and/or sections should not be limited by these terms. These terms may be used to distinguish one signal, element, component, region, layer, or section from another signal, region, layer or section. Thus, a first signal, element, component, region, layer, or section discussed below may be termed a second signal, element, component, region, layer, or section without departing from the teachings of the present invention. The description of an element as "first" does not imply that second or other elements are needed. The terms first, second, third etc. may also be used herein to differentiate different categories of elements. For conciseness, the terms first, second, third, etc. may represent first-category, second-category, third-category, etc., respectively.

In this application, "blocking" may mean "light-blocking"; "transmitting" may mean "light-transmitting."

In this application, "row" and "column" may mean two different directions that are substantially perpendicular to each other. Neither of a "row" and a "column" is necessarily parallel to or perpendicular to a level surface.

First, referring to FIGS. 1, 2, 3, 4A and 4B, a display device according to one or more embodiments of the present invention will be described.

Figure 1:
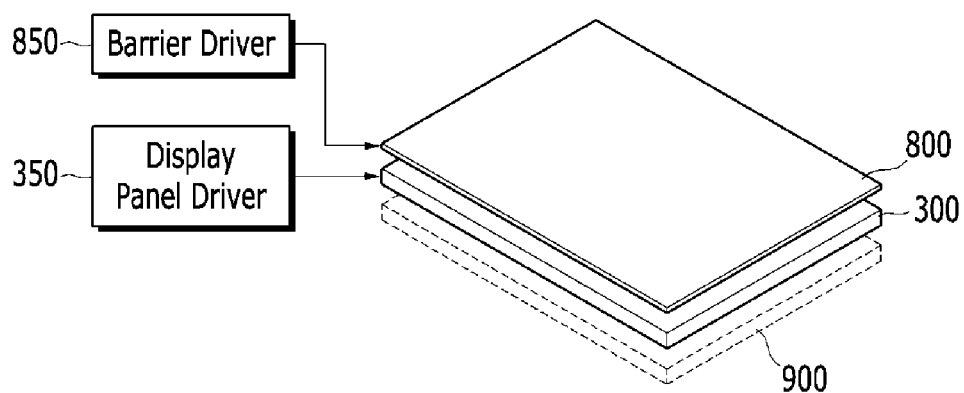
FIG. 1 is a schematic perspective view illustrating a display device according to one or more embodiments of the present invention.
Figure 2:
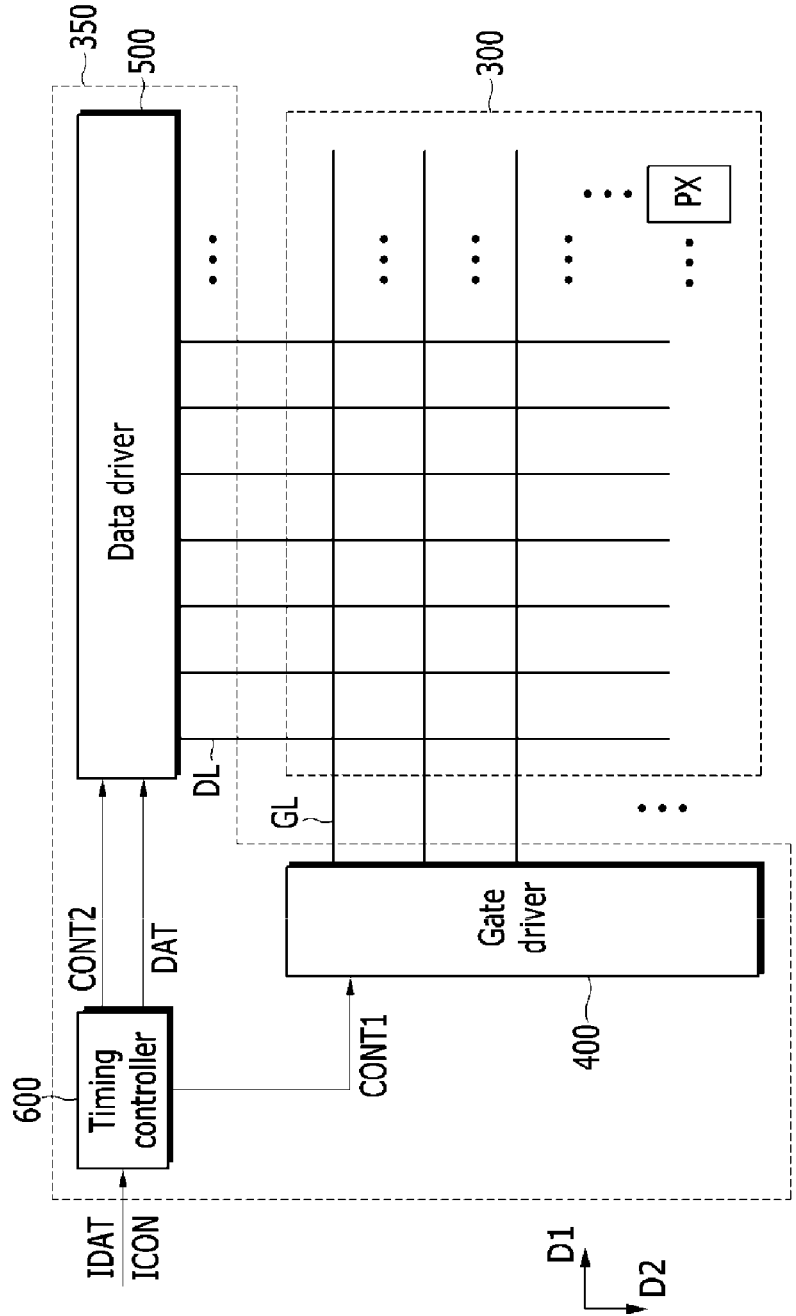
FIG. 2 is a block diagram illustrating a plan view of an image display device according to one or more embodiments of the present invention.
Figure 3:
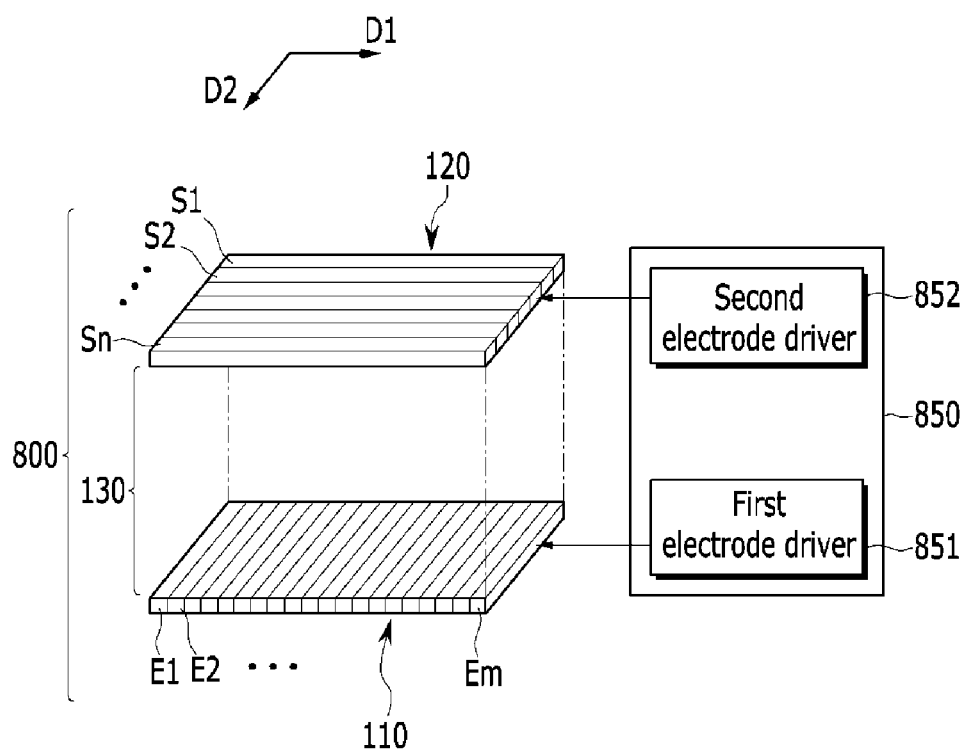
FIG. 3 is a schematic perspective view illustrating a barrier included in a display device according to one or more embodiments of the present invention.
Figure 4A:
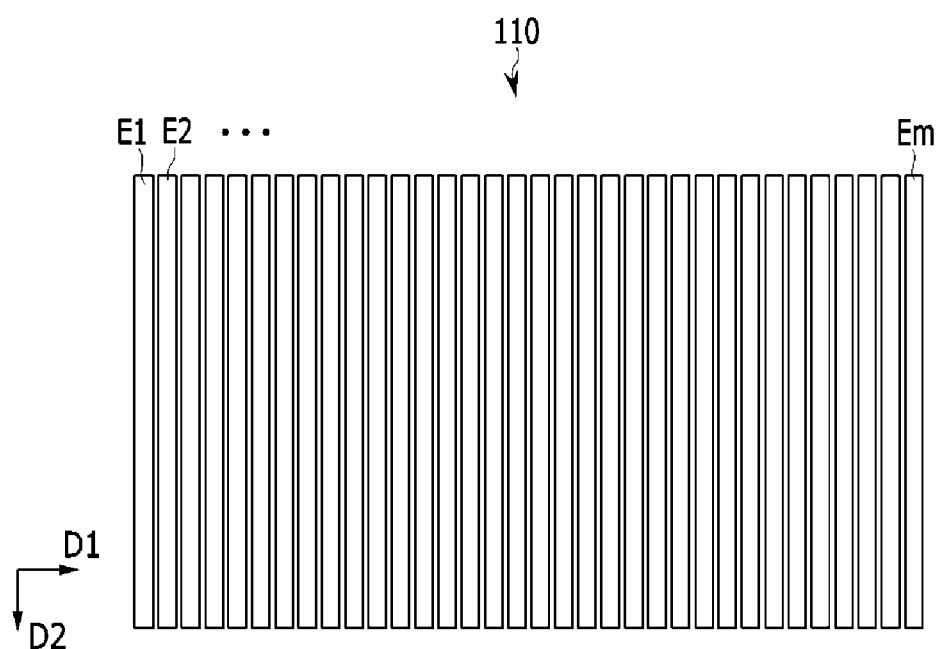
FIGS. 4A and 4B are top plan views illustrating a barrier electrode included in a barrier of a display device according to one or more embodiments of the present invention.
Figure 4B:
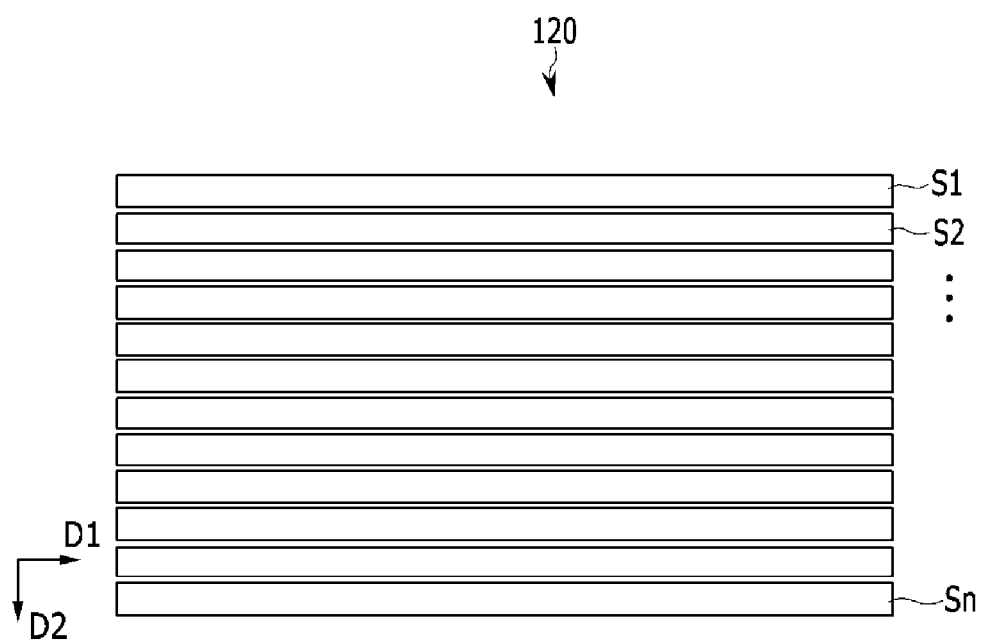

FIG. 1 is a schematic perspective view illustrating a display device according to one or more embodiments of the present invention, FIG. 2 is a block diagram illustrating a plan view of an image display device according to one or more embodiments of the present invention, FIG. 3 is a schematic perspective view of a barrier included in the display device according to one or more embodiments of the present invention, and FIGS. 4A and 4B are top plan views of a barrier electrode included in the barrier of the display device according to one or more embodiments of the present invention.

Referring to FIG. 1, the display device includes a display panel 300, a display panel driver 350, a barrier mechanism 800 (or barrier 800 for conciseness), and a barrier driver 850.

The display panel 300 may display one or more images. In one or more embodiments, the display panel 300 may be any a plasma display panel (PDP), a liquid crystal display panel, an organic light emitting diode display panel, or a different display panel that is known in the art.

The display panel 300 may include a plurality of display signal lines and a plurality of pixels PX connected thereto. The plurality of pixels PX may be arranged in a matrix form. Herein, a row direction is called a first direction D1, and a column direction is called a second direction D2.

The display signal lines include a plurality of gate lines GL for transferring at least a gate signal (also referred to as "scanning signal") and a plurality of data lines DL for transferring at least a data voltage. An extending direction of the gate lines GL may be, as shown in FIG. 2, the first direction D1, and an extending direction of the data lines DL may be the second direction D2 that is substantially vertical to the first direction D1. The first direction D1 may be a horizontal direction extending to the right according to an observer's perspective of view, and the second direction D2 may be a vertical downward direction according to the observer's perspective of view.

Each pixel PX may include a switching element (not shown), such as a thin film transistor, which is connected to a corresponding gate line GL, a corresponding data line DL, and a corresponding pixel electrode (not shown).

The display panel 300 may further include an electric optical active layer for using the data voltage applied to the pixel electrode for generating an optical signal to display an image. For example, the electric optical active layer may be a liquid crystal layer or an electrophoretic layer that includes particles having charges. In one or more embodiments, the display panel 300 is an auto-light emitting type display panel, such as an organic light emitting diode display panel; therefore, the display panel 300 may emit light without requiring a separate light source. In one more embodiments, the display panel 300 may require a separate light source.

The display panel driver 350 is connected to the display panel 300 to generate a driving signal for driving the display panel 300. The display panel driver 350 may include a timing controller 600 (or signal controller 600), a gate driver 400, and a data driver 500.

The timing controller 600 may control operation of the gate driver 400, the data driver 500, etc. The timing controller 600 may receive an input image signal IDAT and an input control signal ICON from one or more external sources. The input image signal IDAT includes luminance information of the image. The luminance may have a predetermined number of grays, for example, $1024=2^{10}$, $256=2^8$, or $64=2^6$. The input control signal ICON may include a vertical synchronization signal Vsync, a horizontal synchronizing signal Hsync, a main clock MCLK, a data enable signal DE, etc. pertaining to the image to be displayed.

The timing controller 600 use the input image signal IDAT and the input control signal ICON to generate an image signal DAT, a gate control signal CONT1, a data control signal CONT2, etc. The timing controller 600 provides the gate control signal CONT1 to the gate driver 400. The timing controller 600 provides the data control signal CONT2 and the image signal DAT to the data driver 500.

The data driver 500 may be connected the data lines DL of the display panel 300. The data driver 500 may divide a gray reference voltage received from a gray voltage generator (not shown) for generating gray voltages; alternatively or additionally, the data driver 500 may receive a plurality of gray voltages from the gray voltage generator. The data driver 500 receives an image signal DAT pertaining to the pixels PX of one row according to the data control signal CONT2, converts the image signal DAT into a data voltage by selecting the gray voltage corresponding to each image signal DAT from the gray voltages, and applies the data voltage to the corresponding data line DL.

The gate driver 400 is connected to the gate lines GL to apply a gate signal (which is formed by the combination of a gate-on voltage Von and a gate-off voltage Voff) to the gate lines GL. In one or more embodiments, scanning (or sequentially applying the gate signal to a plurality of gate lines GL) may start from the gate line GL that is closest to the data driver 500 and may progress in the second direction D2. The gate driver 400 applies the gate-on voltage Von to the gate lines GL according to the gate control signal CONT1 from the timing controller 600 to turn-on the switching elements connected to the gate lines GL. As a result, the data voltages applied to the data lines DL may be applied to the corresponding pixels PX through the turned-on switching elements.

The gate-on voltage Von may be sequentially applied to all gate lines GL, and the data voltages may be applied to all pixels PX to display an image of one frame.

Referring to FIG. 1 again, in one or more embodiments, the barrier 800 is positioned on the display panel 300. In one or more embodiments, the barrier 800 may be disposed under the display panel 300.

Referring to FIGS. 3, 4A, and 4B, the barrier 800 may include a first electrode portion 110 and a second electrode portion 120 overlapping each other; the barrier 800 may further include an optical effect layer 130 positioned between the first electrode portion 110 and the second electrode portion 120. The first electrode portion 110 may include a plurality of first-category electrodes (or, for conciseness, "first electrodes") E1, E2, . . . , and Em (m is a natural number) extending in the second direction D2, arranged along the first direction D1, and separated from each other. The first electrodes E1, E2, . . . , and Em may be formed of a transparent conductive material. Each of the first electrodes E1, E2, . . . , and Em may correspond to one or more data lines DL and/or one or more pixel columns. In one or more embodiments, the width of each of the first electrodes E1, E2, . . . , and Em may be substantially equal to the width of one pixel column. In one or more embodiments, the combined width associated with two or more of first electrodes E1, E2, . . . , and Em may be substantially equal to the width of one pixel column. In one or more embodiments, the width of one of the first electrodes E1, E2, . . . , and Em may be substantially equal to the combined width associated with two or more pixel columns. The width relation between the first electrodes and the pixel columns may be determined according to the driving method of the display panel 300. The first electrodes may also be called column electrodes.

The second electrode portion 120 includes a plurality of second-category electrodes (or, for conciseness, "second electrodes") S1, S2, . . . , and Sn (n is a natural number) extending in the first direction D1, arranged along the second direction D2, and separated from each other. The second electrodes S1, S2, . . . , and Sn may be formed of a transparent conductive material. Each of the second electrodes S1, S2, . . . , and Sn may correspond to one or more gate lines GL and/or one or more pixel rows. The second electrodes may also be called row electrodes.

The optical effect layer 130 may be a layer that transmits light or blocks light according to the voltage(s) applied to the first electrodes E1, E2, . . . , and Em and/or the voltage(s) applied to the second electrodes S1, S2, . . . , and Sn. For example, the optical effect layer 130 may include a liquid crystal layer including liquid crystal molecules. In one or more embodiments, a polarizer (not shown) may be further positioned outside the optical effect layer 130. If a voltage is applied to the first electrodes E1, E2, . . . , and Em and/or if a voltage is applied to the second electrodes S1, S2, . . . , and Sn, arrangement of the liquid crystal molecules of the liquid crystal layer may be changed according to the generated electric field to change whether the liquid crystal layer transmits light or block light.

The barrier driver 850 is connected to the barrier 800 to generate a barrier driving signal for driving the barrier 800. The barrier driver 850 includes a first electrode driver 851 (for driving the first electrodes E1, E2, . . . , and Em) and a second electrode driver 852 (for driving the second electrodes S1, S2, . . . , and Sn). The barrier driver 850 may provide the barrier driving signal to the first electrodes E1, E2, . . . , and Em and/or the second electrodes S1, S2, . . . , and Sn to allow a portion of the optical effect layer 130 or the entire optical effect layer 130 to be in a transmitting state or a blocking state.

The second electrode driver 852 may sequentially apply a barrier driving signal to the second electrodes S1, S2, . . . , and Sn according to a scanning direction that may be the second direction D2 and may be the same as the scanning direction of the gate signal. The scanning frequency of the second electrode driver 852 and the scanning frequency of the gate driver 400 may be substantially equal.

Referring to FIG. 1 again, the display device may further include a backlight 900 positioned at a rear side of the display panel 300. The backlight 900 may generate light and may provide light to the display panel 300. The backlight 900 may include one or more of a cold cathode fluorescent lamp (CCFL), an external electrode fluorescent lamp (EEFL), a flat fluorescent lamp (FFL), a light emitting diode (LED), etc.

In one or more embodiments, the barrier 800 may be positioned between the display panel 300 and the backlight 900.

Figure 5:
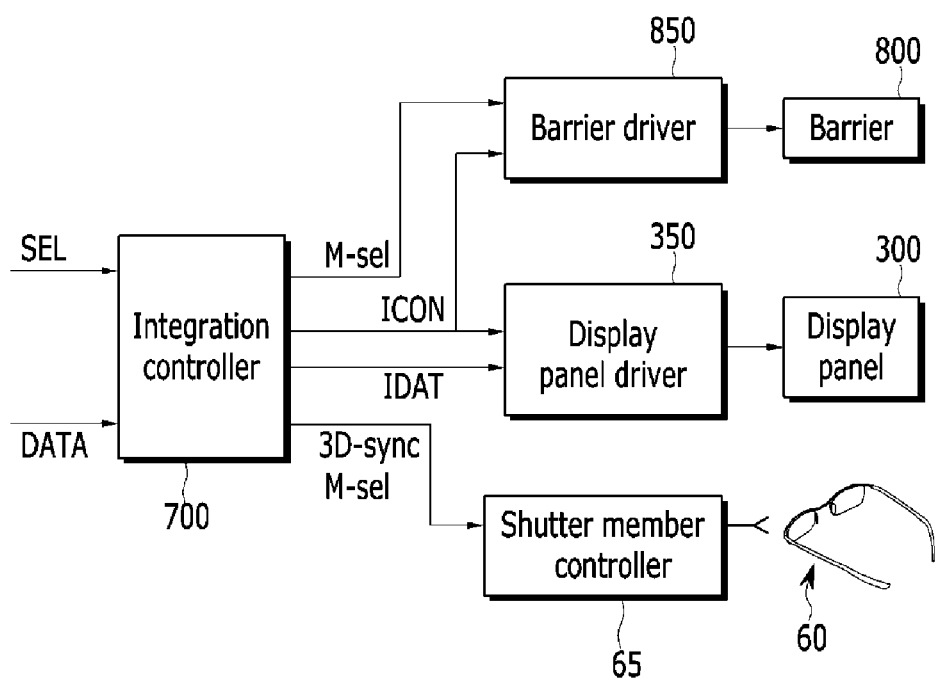
FIG. 5 is a block diagram illustrating a display device according to one or more embodiments of the present invention.

FIG. 5 is a block diagram illustrating a display device according to one or more embodiments of the present invention.

Referring to FIG. 5, the display device includes an integration controller 700, a display panel 300, a display panel driver 350, a barrier 800, and a barrier driver 850. The display device may further include a shutter member 60 such as shutter eyeglasses and a shutter member controller 65 for controlling the shutter member 60.

The integration controller 700 may receive image information DATA and mode selection information SEL from one or more external sources.

The image information DATA may be 2-dimensional image information or 3D image information.

The mode selection information SEL may include one or more of selection information regarding whether the image is to be displayed in a 2-dimensional mode or in a 3D mode, selection information regarding whether the image is to be displayed in a general 2-dimensional mode or in an advanced 2-dimensional mode if the image is to be displayed in the 2-dimensional mode, selection information regarding whether the image is to displayed in a stereoscopic 3D mode or in an autostereoscopic 3D mode if the image is to be displayed in the 3D mode, etc. The display device may display the image according to the mode selection information SEL.

The integration controller 700 may generate one or more of an input image signal IDAT, an input control signal ICON for controlling display related to the input image signal IDAT, a mode selection signal M_sel, a 3D synchronization signal 3D-sync, etc. The input image signal IDAT may be generated based on image information DATA and mode selection information SEL and may be provided to the signal controller 600 (illustrated in FIG. 2) of the display panel driver 350. The input control signal ICON may be provided to the signal controller 600 of the display panel driver 350 and the barrier driver 850. The mode selection signal M_sel may be generated based on mode selection information SEL and may be provided to the barrier driver 850 and the shutter member controller 65. The 3D synchronization signal 3D-sync may be provided to the shutter member controller 65.

The signal controller 600 (illustrated in FIG. 2) of the display panel driver 350 may receive the input image signal IDAT and may use the input image signal IDAT to generate the image signal DAT. If the 3D mode is selected, the image signal DAT may include a left eye image signal L and a right eye image signal R. The left eye image and the left eye image signal may be represented by the same reference numeral L, and the right eye image and the right eye image signal may be represented by the same reference numeral R.

In the case of the 3D mode, the data driver 500 (illustrated in FIG. 2) may convert the left eye image signal L and the right eye image signal R into a left eye data voltage and a right eye data voltage, respectively, to alternately display the images in every frame in each pixel PX, or may alternately input the left eye data voltage and the right eye data voltage to the display panel 300 in consecutive frames.

The barrier driver 850 may be driven in different modes according to the mode selection signal M_sel, and may be driven in synchronization with the input control signal ICON and particularly a vertical synchronization signal Vsync. This will be described in detail later.

The shutter member controller 65 may determine whether the shutter member 60 is driven or not according to the mode selection signal M_sel. For example, if the mode selection signal M_sel includes autostereoscopic 3D mode or 2-dimensional mode selection information, the shutter member 60 is not operated; if the mode selection signal M_sel includes stereoscopic 3D mode selection information, the shutter member 60 may be operated.

The shutter member controller 65 may further receive (from the integration controller 700) a 3D synchronization signal 3D-sync for controlling on-off timing and on-off maintaining time durations of the shutter member 60. The 3D synchronization signal 3D-sync may be synchronized with the input control signal ICON inputted to the display panel 300.

The shutter member 60 (e.g., shutter eyeglasses) may include a left eye shutter (corresponding to a viewer's left eye) and a right eye shutter (corresponding to a viewer's right eye). A viewer (or observer) may recognize the image displayed in the display panel 300 as a 3D image through the on-off of the left eye shutter and the right eye shutter.

Figure 6:
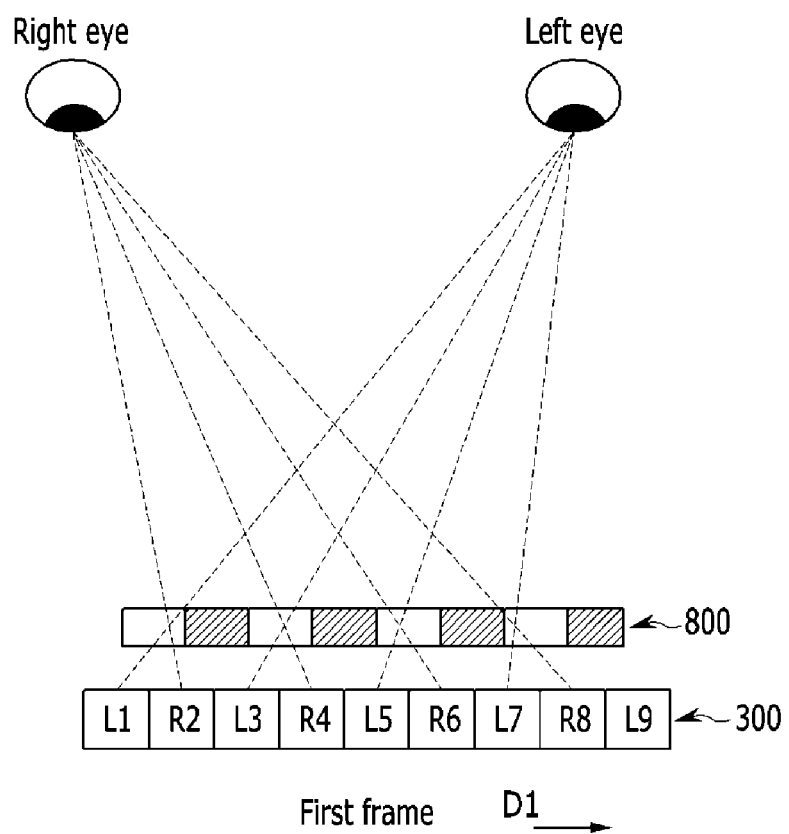
FIGS. 6, 7, and 8 are schematic views illustrating a process for recognizing an image provided by a display device according to one or more embodiments of the present invention.
Figure 7:
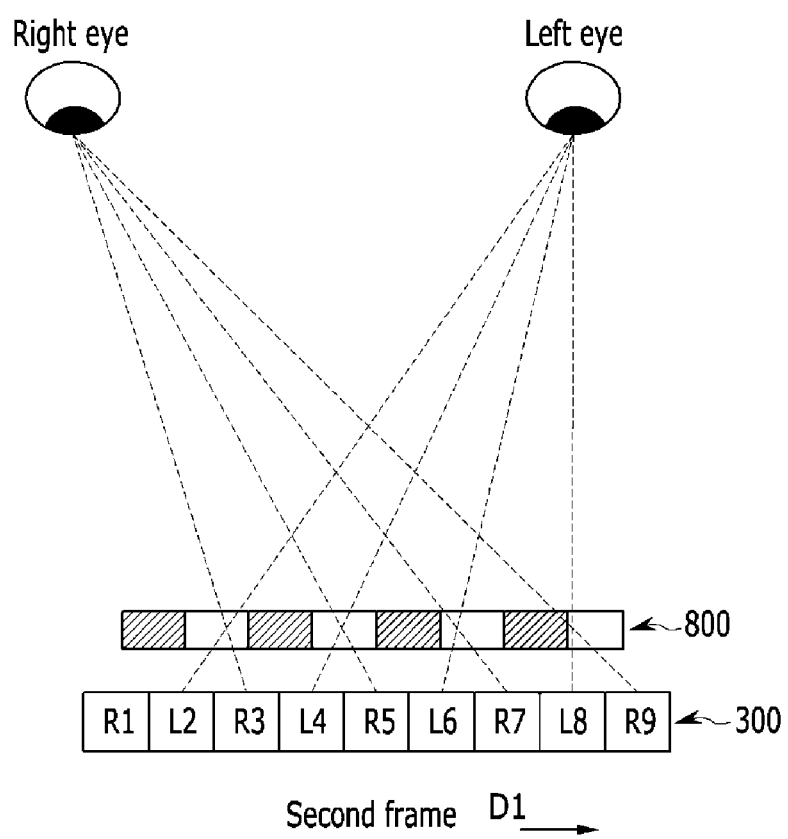
Figure 8:
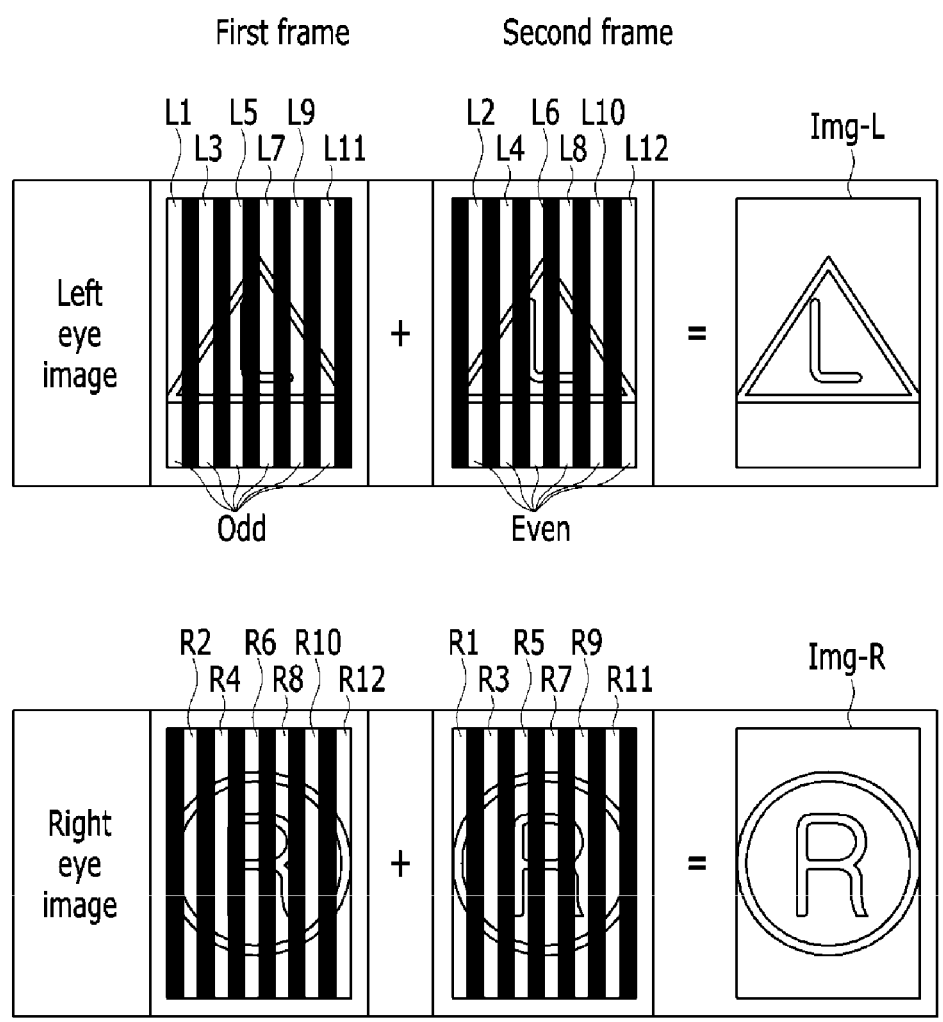

FIGS. 6, 7, and 8 are schematic views illustrating a process for recognizing an image provided by a display device according to one or more embodiments of the present invention.

In one or more embodiments, the display device may be operated in the autostereoscopic 3D mode and in an active barrier 3D mode, wherein the barrier 800 is positioned at a front side of the display panel 300.

In an odd-numbered frame (e.g., a first frame), a plurality of pixel rows of the display panel 300 may alternately (according to pixel columns) display a first set of left eye images (including L1, L3, etc.) and a first set of right eye images (including R2, R4, etc.) along the first direction D1. In one or more embodiments, the barrier 800 includes light-transmitting (open) regions and light-blocking (closed) regions alternately arranged along the first direction D1, and each blocking region and each transmitting region may extend in the second direction D2 that is substantially vertical to the first direction D1.

The blocking region and the transmitting region may each correspond to at least one of the first electrode E1, E2, . . . , and Em of the barrier 800. The transmitting region and the blocking region may be controlled by adjusting the voltage of the barrier driving signal applied to the first electrodes E1, E2, . . . , and Em and/or the second electrodes S1, S2, . . . , and Sn.

In the first frame, the first set of left eye images L1, L3, L5, etc. may be recognized by the left eye of the observer through the transmitting regions of the barrier 800, and the first set of right eye images R2, R4, R6, etc. may be recognized by the right eye through the transmitting regions of the barrier 800.

In an even-numbered frame (e.g., a second frame that immediately follows the first frame), the arrangement of left eye images and right eye images may be be reversed with respect to an odd-numbered frame, and the arrangement of transmission regions and blocking regions may be reversed with respect to the odd-numbered frame. Specifically, the pixel rows displaying the first set of left eye images L1, L3, etc. (in odd-numbered pixel columns) in the first frame may display a second set of right eye images R1, R3, R5, etc. (in the odd-numbered pixel columns) in the second frame, and the pixel rows displaying the first set of right eye images R2, R4, R6, etc. (in even-numbered pixel columns) in the first frame may display a second set of left eye images L2, L4, L6, etc. (in the even-numbered pixel columns) in the second frame. In addition, a transmitting region in the first frame is changed into a blocking region in the second frame, and a blocking region in the first frame is changed into a transmitting region in the second frame.

In the second frame, the second set of left eye images L2, L4, L6, etc. may be recognized by the left eye of the observer through the transmitting regions of the barrier 800, and the second set of right eye images R1, R3, R5, etc. may be recognized by the right eye through the transmitting regions of the barrier 800.

Referring to FIG. 8, the first set of left eye images L1, L3, L5, etc. are recognized by the left eye of the observer in the first frame, and the second set of left eye images L2, L4, L6, etc. are recognized by the left eye of the observer in the second frame. Likewise, the first set of right eye images R2, R4, R6, etc. are recognized by the right eye of the observer in the first frame, and the second set of right eye images R1, R3, R5, etc. are recognized by the right eye of the observer in the second frame. In general, since the frame frequency is 60 Hz or more, and since the images are displayed at a speed at which a man cannot discriminate the images of the adjacent frames, the brain of the observer may recognize left eye synthesis images Img-L by synthesizing the first set of left eye images L1, L3, L5, etc. and the second set of left eye images L2, L4, L6, etc. and may recognize right eye synthesis images Img-R by synthesizing the first set of right eye images R2, R4, R6, etc. and the second set of right eye images R1, R3, R5, etc. Resultantly, the brain of the observer may recognize a 3D image having a depth by mixing the left eye synthesis images Img-L and the right eye synthesis images Img-R.

Figure 9:
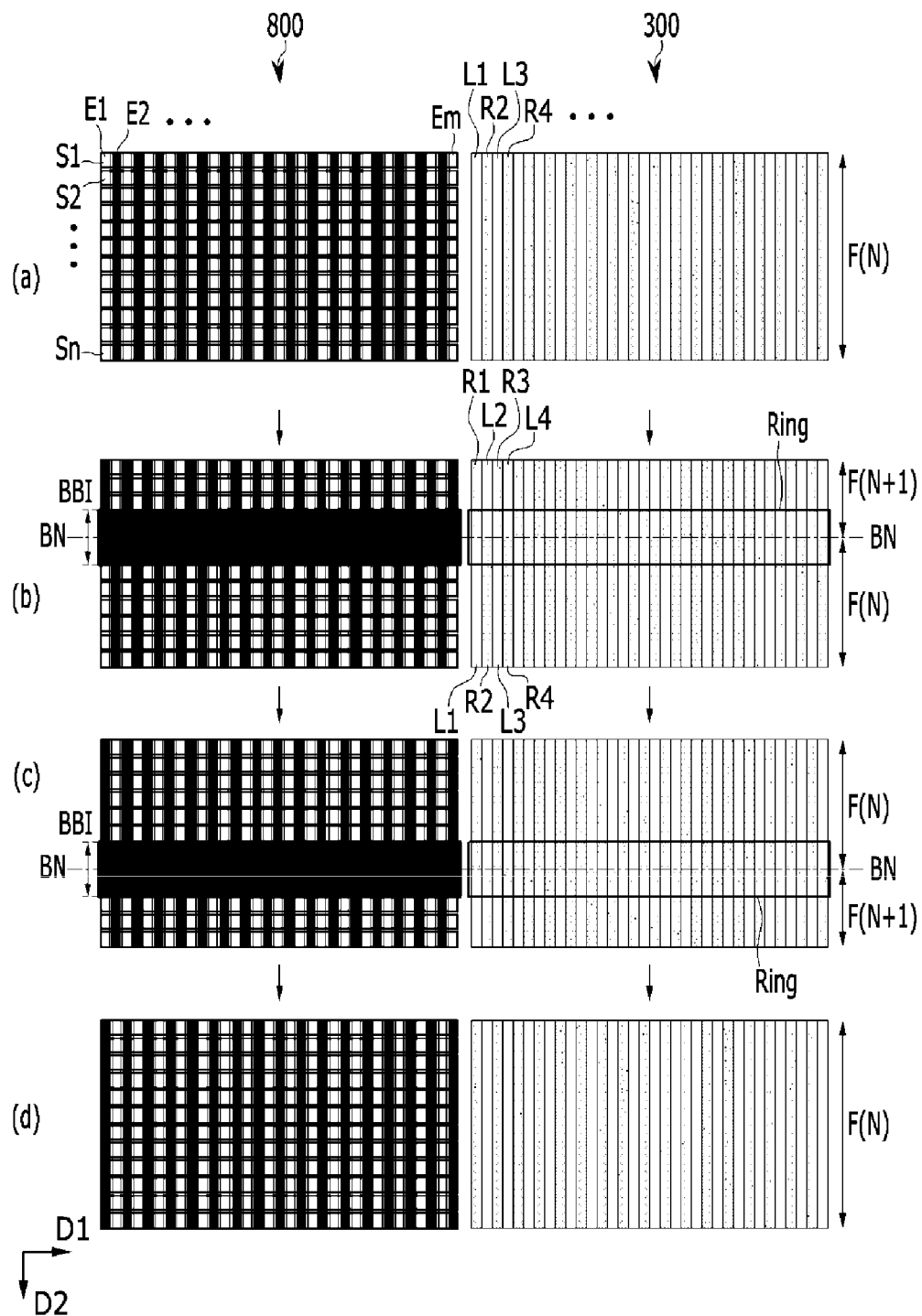
FIG. 9 includes schematic views illustrating a method of operating a display panel and a barrier of a display device in two consecutive frames according to one or more embodiments of the present invention.

FIG. 9 includes schematic views illustrating a method of operating a display panel and a barrier of the display device in two consecutive frames according to one or more embodiments of the present invention. FIG. 10 includes timing views illustrating a driving method of the display device according to one or more embodiments of the present invention.

In one or more embodiments, one frame may start according to an output of pulse of a vertical synchronization signal Vsync generated on one frame cycle. The gate driver 400 sequentially applies the gate-on voltage Von to the gate lines GL according to the gate control signal CONT1 from the signal controller 600. The data driver 500 receives the image signal DAT from the signal controller 600 and applies the corresponding data voltage to the data line DL according to the data control signal CONT2.

Referring to FIG. 10(a), the image signal DAT of the display device may include the left eye image signal L and the right eye image signal R. The left eye image signal L and the right eye image signal R may be alternately inputted to the pixels PX in consecutive frames. In one or more embodiments, the input frequency of the image signal DAT may be 120 Hz. In one or more embodiments, the input frequency of the image signal DAT may have one of various values such as 240 Hz and 360 Hz.

A vertical blank period Blank in which the image signal DAT is not inputted may be positioned between input periods of the image signal DAT of adjacent frames. In each frame, an image signal input time Td in which the image signal DAT is inputted to all pixels PX and a vertical blank period duration time Tb between the frames may be adjusted. The sum of the image signal input time Td and the vertical blank period duration time Tb may be equal to one frame. In one or more embodiments, the vertical blank period duration time Tb may be about 30% or more of one frame.

Referring to FIG. 9(a), the display panel 300 of the display device may be in a state where the first set of left eye images L1, L3, etc. and the first set of right eye images R2, R4, etc. are alternately displayed along the first direction D1 at the time of finishing the first frame F(N).

In one or more embodiments, the barrier 800 may include the transmitting regions and the blocking regions alternately arranged along the first direction D1. Each of the blocking regions and the transmitting regions may correspond to at least one of the first electrodes E1, E2, . . . , and Em.

Next, referring to FIGS. 9(b) and 9(c), when the second frame F(N+1) that is next to the first frame F(N) starts, sequential scanning of the gate signal to the gate lines GL of the display panel 300 is performed from the top side in the second direction D2 to start to display the image of the second frame F(N+1) from the top side. As described above, when the second frame F(N+1) starts, the image displayed by each pixel column starts to change. That is, the pixel rows displaying the first left eye images L1, L3, L5, etc. in odd-numbered pixel columns in the first frame F(N) may change to display the second right eye images R1, R3, R5, etc. in the odd-numbered pixel columns in the second frame F(N+1), and the pixel rows displaying the first right eye images R2, R4, R6, etc in even-numbered pixel columns in the first frame F(N) may change to display the second left eye images L2, L4, L6, etc. in the even-numbered pixel columns in the second frames F(N+1).

A frame boundary BN may be present between the images of the first frame F(N) and the second frame F(N+1) at an intermediate time of the second frame F(N+1). The frame boundary BN may correspond to the gate line GL to which the gate signal is inputted or the gate line GL adjacent thereto.

In one or more embodiments, the display panel 300 includes a response transition region Ring in the course of changing the image of the first frame F(N) into the image of the second frame F(N+1), corresponding to the frame boundary BN.

For example, referring to FIG. 10(a), in the case where the left eye image signal L is configured for displaying the white and the right eye image signal R is configured for displaying the black, if the left eye image signal L is inputted to the display panel 300, as illustrated in FIG. 10(a), response graph the degree of target luminance of the image corresponding to the left eye image signal L may increase corresponding to the left eye image signal L, and a response is approximately finished after a first response time Tr. The response graph illustrated in FIG. 10(a) may be a graph illustrating the degree of luminance change according to a response of the electric optical active layer of the display panel 300 when the image displayed in the frame is changed according to the image signal DAT. If the right eye image signal R is inputted during the next frame after the left eye image signal L is inputted, as illustrated in the response graph of FIG. 10(a), the luminance decreases, and the response is substantially finished after a second response time Tf.

Each section in the response graph where the luminance is changed, that is, each of the region corresponding to the first response time Tr and the region corresponding to the second response time Tf, may correspond to a response transition region Ring. In one or more embodiments, the first response time Tr or the second response time Tf may be a time duration during which the luminance is changed from a first percentage to a second percentage, for example, from about 1% to about 99% of a difference between previous luminance and target luminance.

Referring to FIGS. 9(b) and 9(c) again, the width of the response transition region Ring (where the width is the width of Ring in the second direction D2) may be more than 0 and may be changed according to the response speed of the display panel 300. For example, in the case of the liquid crystal display, if the displayed image is to be changed from a frame to the next frame, a predetermined time may be required to change an arrangement direction of liquid crystal of the liquid crystal layer around the frame boundary BN, and the portion of the liquid crystal layer having changes around the frame boundary BN may be included in (or may correspond to) the response transition region Ring.

The response transition region Ring may cover the frame boundary BN. In one or more embodiments, the frame boundary BN may be approximately positioned over (or may substantially overlap) a horizontal central line of the response transition region Ring. The position relationship between the frame boundary BN and the response transition region Ring may be configured according to particular design conditions, such as a liquid crystal mode.

The frame boundary BN and the response transition region Ring may be scanned in the second direction D2 according to scanning of the gate signal and scanning of the image signal DAT.

Referring to FIGS. 9(b), 9(c), and 10(a), when the response transition region Ring is present in the display panel 300, the barrier 800 includes a barrier black section BBI corresponding to the response transition region Ring. The barrier black section BBI may be a light-blocking section or light-blocking region corresponding to one or more adjacent second electrodes (or adjacent row electrodes) of the second electrodes (or row electrodes) 51, S2, . . . , and Sn overlapping the frame boundary BN and may have a shape of a band extending the first direction D1. The barrier black section BBI may be scanned so as to correspond to the frame boundary BN and the response transition region Ring in the second direction D2 from an upper end of the display panel 300. The scanning speed of the barrier black section BBI may be substantially equal to the scanning speed of the frame boundary BN and the gate signal.

In one or more embodiments, the width of the barrier black section BBI shown in FIG. 9 (where the width is the width of the BBI in the second direction D2) may be approximately equal to the width of the response transition region Ring. In one or more embodiments, the width of the barrier black section BBI may be substantially different from the width of the response transition region Ring. In one or more embodiments, the width of the barrier black section BBI may be determined based on various factors, such as image brightness and image quality.

FIG. 10(a) illustrates the timing where the barrier black section BBI is displayed based on each of the second electrodes 51, S2, . . . , and Sn.

Referring to FIG. 10(a), the duration time TB of a barrier black section BBI, during which the correspond second electrode(s) may drive the optical effect layer 130 to block light, may correspond to the section in the response graph where luminance of the pixels PX of the display device is changed according to the input of the image signal DAT. The two curves in each response graph section corresponding to a BBI indicate a response curve of the first pixel row and a response curve of the last pixel row when each of the second electrodes 51, S2, . . . , and Sn correspond to a plurality of pixel rows. In one or more embodiments, the duration time TB of the barrier black section BBI may be longer than each of the first response time Tr and the second response time Tf. In one or more embodiments, the duration time TB of the barrier black section BBI may not be longer than the first response time Tr or may not be longer than the second response time Tf. In one or more embodiments, the duration time TB of the barrier black section BBI may be appropriately configured so that the potential crosstalk corresponding to the response transition region Ring is not conspicuous.

The barrier black section BBI may be scanned in the second direction D2 by setting at least one of the second electrodes S1, S2, . . . , and Sn as a unit, and the scanning interval Ti (the time difference between the starts of two BBIs) thereof may be approximately the same as the time obtained by dividing the input time Td of the image signal DAT by n or n−1, wherein n is the number of second electrodes S1, S2, . . . , and Sn.

In one or more embodiments of the present invention, if the duration time Tb of the vertical blank period is relatively long, the scanning interval Ti can be short, to prevent the boundary between barrier black sections (or light-blocking sections displayed using the second electrodes S1, S2, . . . , and Sn) from being recognized by the observer, especially if the number n of second electrodes S1, S2, . . . , and Sn is small. According to the experiment, when the scanning interval Ti is about 0.5 ms or more, the boundary between barrier black sections may be recognized. Accordingly, the number n of second electrodes S1, S2, . . . , and Sn or the duration time Tb of the vertical blank period may be adjusted so that the scanning interval Ti is less than about 0.5 ms, thus increasing the display quality of the 3D image. In one or more embodiments, the duration time Tb of the vertical blank period may be about 30% or more of one frame in order to prevent the boundaries between light-blocking portions of the optical effect layer 130 corresponding to the second electrodes S1, S2, . . . , and Sn from being recognized.

In one or more embodiments, referring to FIG. 10(a), the width of the barrier black section BBI may be approximately equal to the sum of the first response time Tr and the scanning interval Ti.

In one or more embodiments, only when the images of two adjacent frames displayed in the display panel 300 are different from each other, that is, only when a motion picture is displayed, the barrier 800 may display the barrier black section BBI. In one or more embodiments, in the case where there is no change in image when the input image signals IDAT of two adjacent frames are compared to each other, the integration controller 700 or the signal controller 600 may control the barrier driver 850 so that the barrier black section BBI is not scanned.

In one or more embodiments, since the barrier black section BBI of the barrier 800 blocks the response transition region Ring of the display panel 300 so as not to allow the observer to recognize the response transition region, it is possible to prevent a crosstalk. In one or more embodiments, in the case of the liquid crystal display, the display quality may be improved by preventing the observer from recognizing the crosstalk according to a limit of the response speed of liquid crystal of the liquid crystal layer.

In one or more embodiments, the light source such as the backlight of the known liquid crystal display may not need to be turned off for a predetermined time in order to prevent the response transition region Ring from being recognized, but may remain turned on. Advantageously, luminance of the image may be increased, and driving of the backlight may be simplified.

If a region of the optical effect layer 130 corresponds to one or more second electrodes that do not correspond to the barrier black section BBI, and if the region correspond to the even numbered first electrodes E2, E4, etc. or the odd numbered first electrodes E1, E3, etc., the region may be a transmitting region of the optical effect layer 130. The barrier black section BBI may be positioned between two sets of transmitting regions of the optical effect layer 130 in a plan view of the display device in a frame.

Given scanning, a region that is a transmitting region in the first frame F(N) may be changed into a blocking region in the second frame F(N+1), and a region that is a blocking region in the first frame F(N) may be changed into a transmitting region in the second frame F(N+1).

FIG. 10(b) shows a state of the regions corresponding to at one of second electrode S1, S2, ..., and Sn and at least one of first electrode E1, E2, ..., and Em according to the time. For example, a transmitting region (open) corresponding to at least one of second electrode S1, S2, ..., and Sn and odd numbered first electrodes E1, E3, etc. in the first frame F(N) is changed into a blocking region (close) corresponding to the barrier black section BBI together with a start of the second frame F(N+1) and continues to be a blocking region (close) even after the region has deviated from the barrier black section BBI. A blocking region (close) corresponding to at least one of second electrode S1, S2, ..., and Sn and even numbered first electrode E2, E4, etc. is maintained as a blocking region (close) in the first frame F(N) corresponding to the barrier black section BBI together with a start of the second frame F(N+1) and is changed into a transmitting region (open) after the region has deviated from the barrier black section BBI. The interval of changing the states of the transmitting region (open) and the blocking region (close) corresponding to the first electrodes E1, E2, ..., and Em may be two frames.

Referring to FIG. 9(d), if the scanning of the barrier black section BBI, the response transition region Ring, or the frame boundary BN is finished, the entire pixel PX of the display panel 300 displays the image of the second frame F(N+1), and the barrier 800 alternately provides blocking regions and transmitting regions along the first direction D1.

In one or more embodiments, two or more adjacent second electrodes of second electrodes S1, S2, ..., and Sn may be driven in synchronization at the same timing by the voltage having the same phase.

Then, referring to FIGS. 11 and 12, an example of a method of displaying blocking regions and transmitting regions using the barrier included in the display device will be described in detail.

Figure 11:
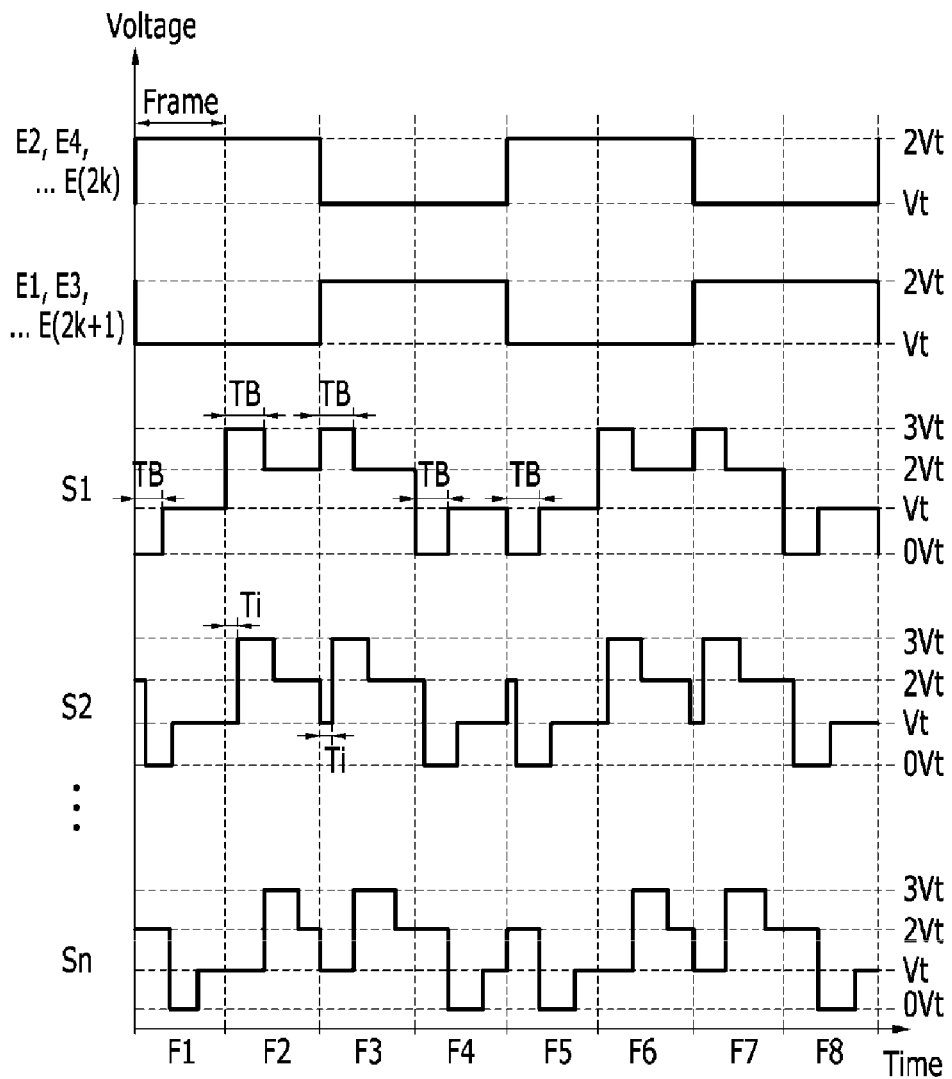
FIG. 11 is a timing view illustrating a voltage applied to an electrode included in a barrier of a display device according to one or more embodiments of the present invention.

FIG. 11 is a timing view illustrating at least a voltage applied to at least an electrode included in the barrier of the display device according to one or more embodiments of the present invention. FIG. 12 is a timing view illustrating a voltage difference between the electrodes included in the barrier of the display device according to one or more embodiments of the present invention.

FIG. 11 shows an example of the voltages applied to the first electrodes E1, E2, ..., and Em and the second electrodes S1, S2, ..., and Sn included in the barrier 800 according to the consecutive frames F1, F2, F3, etc. according to one or more embodiments of the present invention. In one or more embodiments, the optical effect layer 130 included in the barrier 800 may display light-transmitting regions (open) when (and where) voltage differences between the first electrodes E1, E2, ..., and Em and the second electrodes S1, S2, ..., and Sn facing each other are a predetermined voltage (e.g., 0 V), and the optical coversion layer 130 may display light-blocking regions (closed) in the case of other voltage differences. In one or more embodiments, the voltage difference at which the light-transmitting regions (open) and the light-blocking regions (closed) are displayed may be determined according to characteristics of the optical effect layer 130.

In one or more embodiments, the voltages applied to the first electrodes E1, E2, ..., and Em and the second electrodes S1, S2, ..., and Sn of the barrier 800 may have at least four different voltage levels in order to display the barrier black section BBI and to display the blocking regions and the transmitting regions alternately along the first direction D1.

In one or more embodiments, the voltage applied to each of the first electrodes E1, E2, ..., and Em and/or each of the second electrodes S1, S2, ..., and Sn may include a first voltage Vt (Vt is a voltage other than 0), a second voltage 2Vt, a third voltage 3Vt, and a fourth voltage 0Vt. In one or more embodiments, the even numbered first electrodes E2, E4, ..., and E(2k) (k is a natural number of m/2 or less) and the odd numbered first electrodes E1, E3, ..., and E(2k+1) may each periodically swing between the first voltage Vt and the second voltage 2Vt on a 2-frame interval. In one or more embodiments, the waveform of the voltages applied to the even numbered first electrodes E2, E4, etc. may be reverse with respect to the waveform of the voltages applied to the odd numbered first electrodes E1, E3, etc.

The waveforms of the voltages applied to a plurality of second electrodes S1, S2, ..., and Sn may be repetitively shifted according to the scanning interval Ti. The waveform of the voltage applied to one of second electrode S1, S2, ..., and Sn may be a waveform that is obtained by shifting, for each frame, the waveform of the voltage applied to the prior second electrode by the scanning interval Ti.

As an example, when the first frame F1 starts, the fourth voltage 0Vt is applied to the first second electrode S1 (i.e., first row electrode S1) during the duration time TB, which corresponds to the barrier black section. As shown in FIG. 12, the voltage difference between the even numbered first electrode E(2k) and the first second electrode S1 becomes the second voltage 2Vt, and the region corresponding to the even numbered first electrode E(2k) becomes a light-blocking region (closed). Further, the voltage difference between the odd numbered first electrode E(2k+1) and the second electrode S1 becomes the first voltage Vt, and the region corresponding to the odd numbered first electrode E(2k+1) becomes a light-blocking region (closed). That is, all portions of the first electrodes E1, E2, ..., and Em (i.e., column electrodes) facing (or overlapping) the second first electrode S1 correspond to light-blocking regions, resulting in the barrier black section BBI.

After the duration time TB of the barrier black section, the first voltage Vt may be applied to the first second electrode S1 and may be maintained during the remaining portion of the first frame F1. As shown in FIG. 12, the voltage difference between the even numbered first electrode E(2k) and the first second electrode S1 becomes the first voltage Vt, and these electrodes still correspond to a blocking region (closed). In one or more embodiments, the first voltage Vt has a plus polarity, and the voltage difference between the even numbered first electrode E(2k) and the second first electrode S1 in the first frame F1 may have a plus polarity (+). The voltage difference between the odd numbered first electrode E(2k+1) and the first second electrode S1 becomes the fourth voltage 0Vt, and the odd numbered first electrode E(2k+1) corresponds to a light-transmitting region (open). That is, after the duration time TB of the barrier black section BBI, the portion of the even numbered first electrode E(2k) facing (or overlapping) the second electrode S1 may correspond to a blocking region (closed), and the odd numbered first electrode E(2k+1) may correspond to a transmitting region (open), such that the image provided by the display panel 300 may be selectively presented to the left eye and the right eye of the observer to recognize the image as a 3D image.

When the second frame F2 starts, the third voltage 3Vt is applied to the first second electrode S1 during the duration time TB of the barrier black section. As shown in FIG. 12, the voltage difference between the even numbered first electrode E(2k) and the first second electrode S1 becomes the minus first voltage −Vt, and the even numbered first electrode E(2k) corresponds to a blocking region (closed). The voltage difference between the odd numbered first electrode E(2k+1) and the second electrode S1 becomes the minus second voltage −2Vt, and the odd numbered first electrode E(2k+1) corresponds to a blocking region (closed). That is, all portions of the first electrodes E1, E2, . . . , and Em facing (or overlapping) the first second electrode S1 correspond to blocking regions (closed), resulting in the barrier black section BBI.

After the duration time TB of the barrier black section, the second voltage 2Vt may be applied to the first second electrode S1 and maintained during the remaining portion of the second frame F2. As shown in FIG. 12, the voltage difference between the even numbered first electrode E(2k) and the first second electrode S1 becomes the fourth voltage 0Vt, such that the even numbered first electrode E(2k) corresponds to a transmitting region (open), contrary to the first frame F1. The voltage difference between the even numbered first electrode E(2k) and the second electrode S1 may have a minus polarity (−) in the second frame F2. The voltage difference between the odd numbered first electrode E(2k+1) and the first second electrode S1 becomes the minus first voltage −Vt, and the odd numbered first electrode E(2k+1) corresponds to a blocking region (closed), contrary to the first frame F1. That is, in the second frame F2, after the duration time TB of the barrier black section BBI, a transmitting state or a blocking state of the portions of the first electrodes E1, E2, etc. facing (or overlapping) the first second electrode S1 may be opposite to that in the first frame F1, the prior frame.

When the third frame F3 starts, the third voltage 3Vt is applied to the first second electrode S1 during the duration time TB of the barrier black section. As shown in FIG. 12, the voltage difference between the even numbered first electrode E(2k) and the first second electrode S1 becomes the minus second voltage −2Vt, and the even numbered first electrode E(2k) corresponds to a blocking region (closed). The voltage difference between the odd numbered first electrode E(2k+1) and the first second electrode S1 becomes the minus first voltage −Vt, and the odd numbered first electrode E(2k+1) corresponds to a blocking region (closed). That is, all portions of the first electrodes E1, E2, . . . , and Em facing (or overlapping) the second electrode S1 correspond to blocking regions (closed), resulting in the barrier black section BBI.

After the duration time TB of the barrier black section, the second voltage 2Vt may be applied to the first second electrode S1 and maintained during the remaining portion of the third frame F3. As shown in FIG. 12, the voltage difference between the even numbered first electrode E(2k) and the first second electrode S1 becomes the minus first voltage −Vt, such that the even numbered first electrode E(2k) corresponds to a blocking region (closed), contrary to the second frame F2. The voltage difference between the odd numbered first electrode E(2k+1) and the first second electrode S1 becomes the fourth voltage 0Vt, and the odd numbered first electrode E(2k+1) corresponds to a transmitting region (open), contrary to the second frame F2. That is, in the third frame F3, after the duration time TB of the barrier black section BBI, a transmitting state or a blocking state of the portions of the first electrodes E1, E2, etc. facing (or overlapping) the first second electrode S1 may be opposite to that in the second frame F2, the prior frame.

When the fourth frame F4 starts, the fourth voltage 0Vt is applied to the first second electrode S1 during the duration time TB of the barrier black section. As shown in FIG. 12, the voltage difference between the even numbered first electrode E(2k) and the first second electrode S1 becomes the first voltage Vt, and the even numbered first electrode E(2k) corresponds to a blocking region (closed). The voltage difference between the odd numbered first electrode E(2k+1) and the first second electrode S1 becomes the second voltage 2Vt, and the odd numbered first electrode E(2k+1) corresponds to a blocking region (closed). That is, all portion of the first electrodes E1, E2, . . . , and Em facing (or overlapping) the first second electrode S1 correspond to blocking regions (closed), resulting in the barrier black section BBI.

After the duration time TB of the barrier black section, the first voltage Vt may be applied to the second electrode S1 and maintained during the remaining portion of the fourth frame F4. As shown in FIG. 12, the voltage difference between the even numbered first electrode E(2k) and the first second electrode S1 becomes the fourth voltage 0Vt, such that the even numbered first electrode E(2k) corresponds to a transmitting region (open), contrary to the third frame F3. The voltage difference between the odd numbered first electrode E(2k+1) and the second electrode S1 becomes the first voltage Vt, and the odd numbered first electrode E(2k+1) corresponds to a blocking region (closed), contrary to the third frame F3. That is, in the fourth frame F4, after the duration time TB of the barrier black section BBI, a transmitting state or a blocking state of the portions of the first electrode E1, E2, etc. facing (or overlapping) the first second electrode S1 may be opposite to that in the third frame F3, the prior frame.

Operation of the first to fourth frames F1, F2, F3, and F4 may be continuously repeated for subsequent frames.

As described above, an absolute value of the voltage difference between the first second electrode S1 and the portions of the first electrodes E1, E2, etc. facing (or overlapping) the first second electrode S1 in the barrier black section BBI in each frame may become the first voltage Vt or the second voltage 2Vt to correspond to blocking regions (closed), and the absolute value of the voltage difference between the first second electrode S1 and the portions of the first electrodes E1, E2, etc. facing (or overlapping) the first second electrode S1 in the remaining section of the frame may swing between the first voltage Vt and the fourth voltage 0Vt on a one-frame interval to alternately display blocking regions (closed) and transmitting regions (open). In this case, the polarity of the voltage difference between the first second electrode S1 and the portions of the first electrodes E1, E2, etc. facing the first second electrode S1 may be reversed on a predetermined interval to remove cumulative charges, thus allowing the barrier 800 to precisely display the blocking regions (closed) and the transmitting regions (open). In one or more embodiments, the interval of the reversing of the polarity may be two frames. In one or more embodiments, the interval of the reversing of the polarity may be greater than or less than two frames.

The operation related to each of the other second electrodes, or row electrodes, i.e., S2, . . . , and Sn, may be analogous to the operation related to the first second electrode S1, with a delay of Ti relative to its previous row electrode.

Figure 13:
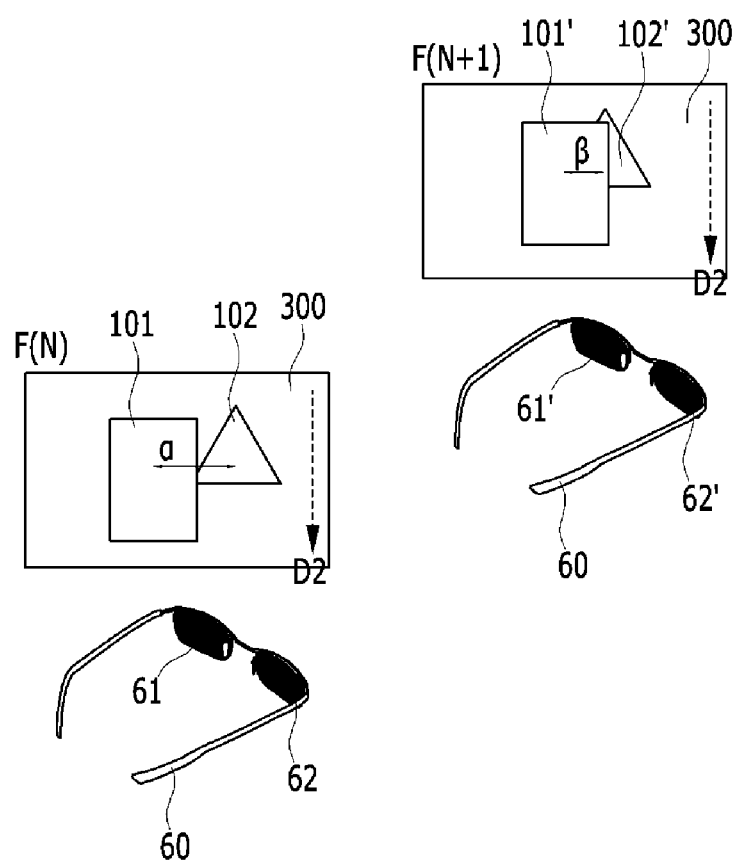
FIG. 13 is a view schematically illustrating operation of a display device according to one or more embodiments of the present invention.

FIG. 13 is a view schematically illustrating operation of the display device according to one or more embodiments of the present invention.

The display device may further include a shutter member 60, such as shutter eyeglasses used by the observer, to be operated in a stereoscopic 3D mode. In one or more embodiments, the barrier 800 may be positioned at a front side of the display panel 300, between the display panel 300 and the shutter member 60.

The shutter member 60 according to one or more embodiments of the present invention, as shown in FIG. 13, may be shutter eyeglasses including a left eye shutter (which may be an open left eye shutter 61 or a closed left eye shutter 61' depending on its state) and a right eye shutter (which may be a closed right eye shutter 62 or an open right eye shutter 62' depending on its state). The shutter eyeglasses may include one or more of mechanical shutter eyeglasses (goggle), optical shutter eyeglasses, a headmount, shutter eyeglasses formed of a shutter using a micro electromechanical system (referred to as "MEMS"), etc.

Referring to FIG. 13, as an example, the display panel 300 may alternately display the left eye images 101 and 102 and the right eye images 101' and 102'. The right eye shutter (62 or 62') and the left eye shutter (61 or 61') of the shutter member 60 are synchronized with the display panel 300 to alternately block light. The left eye shutter may be the open left eye shutter 61 in an open state or the closed left eye shutter 61' in a closed state, and the right eye shutter may be the closed right eye shutter 62 in a closed state or the open right eye shutter 62' in an open state. For example, in a first frame F(N), the left eye shutter may be in the closed state, with the right eye shutter in the open state; in a second frame F(N+1), the right eye shutter may be in the closed state, with the left eye shutter in the open state. In one or more embodiments, both of the left eye shutter and the right eye shutter may simultaneously be in the open or closed state according to a display mode.

When the left eye images 101 and 102 are displayed by the display panel 300 in F(N), the open left eye shutter 61 of the shutter member 60 is in the open state in which light is transmitted, and the closed right eye shutter 62 is in the closed state in which light is blocked. When the right eye images 101' and 102' are outputted in the display panel 300 in F(N+1), the open right eye shutter 62' of the shutter member 60 is in the open state in which light is transmitted, and the closed left eye shutter 61' is in the closed state in which light is blocked. Accordingly, the left eye images may be recognized by only the left eye for a predetermined time, and the right eye images may be recognized by only the right eye for a next predetermined time. Therefore, the 3D image having depth perception may be recognized by a difference between the left eye image and the right eye image.

The image recognized by the left eye is an image for the first frame F(N), in which there is a distance of α between a center portion of the quadrangular left eye image 101 and a center portion of the triangular left eye image 102. The image recognized by the right eye is an image for the second frame F(N+1), wherein there is a distance of β between a center portion of the quadrangular right eye image 101' and a center portion of the triangular right eye image 102'. The α and the β may have different values. As described above, if distances between images recognized by both eyes are different from each other, the triangle is recognized to be positioned at the rear of the quadrangle while being spaced therefrom, depth perception may be ensured. The distances α and β between center portions of the triangle and the quadrangle may be adjusted to adjust the depth perception associated with the two shapes.

Figure 14:
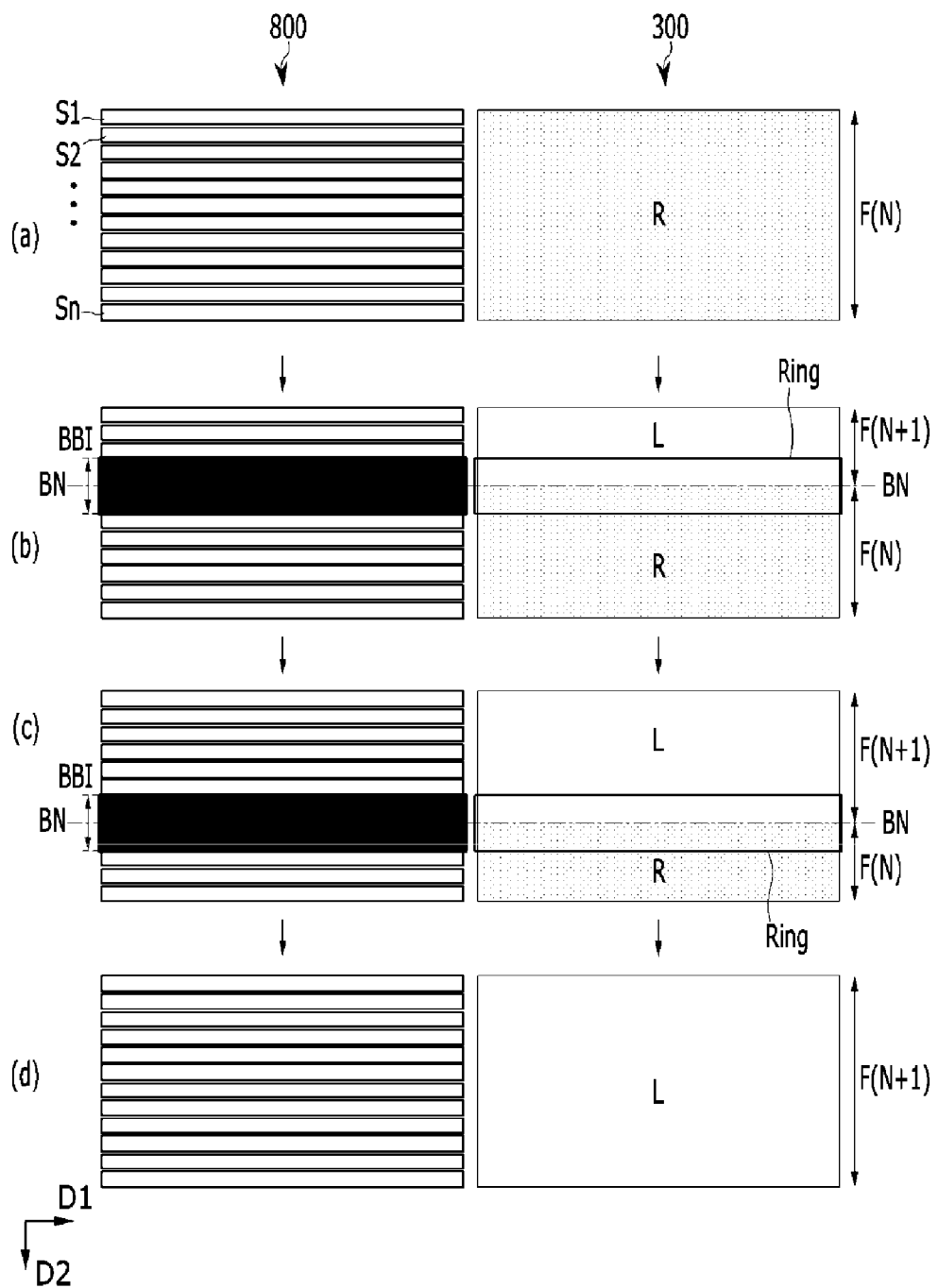
FIG. 14 is a view illustrating a method of operating a display panel and a barrier of a display device in two consecutive frames according to one or more embodiments of the present invention.
Figure 15:
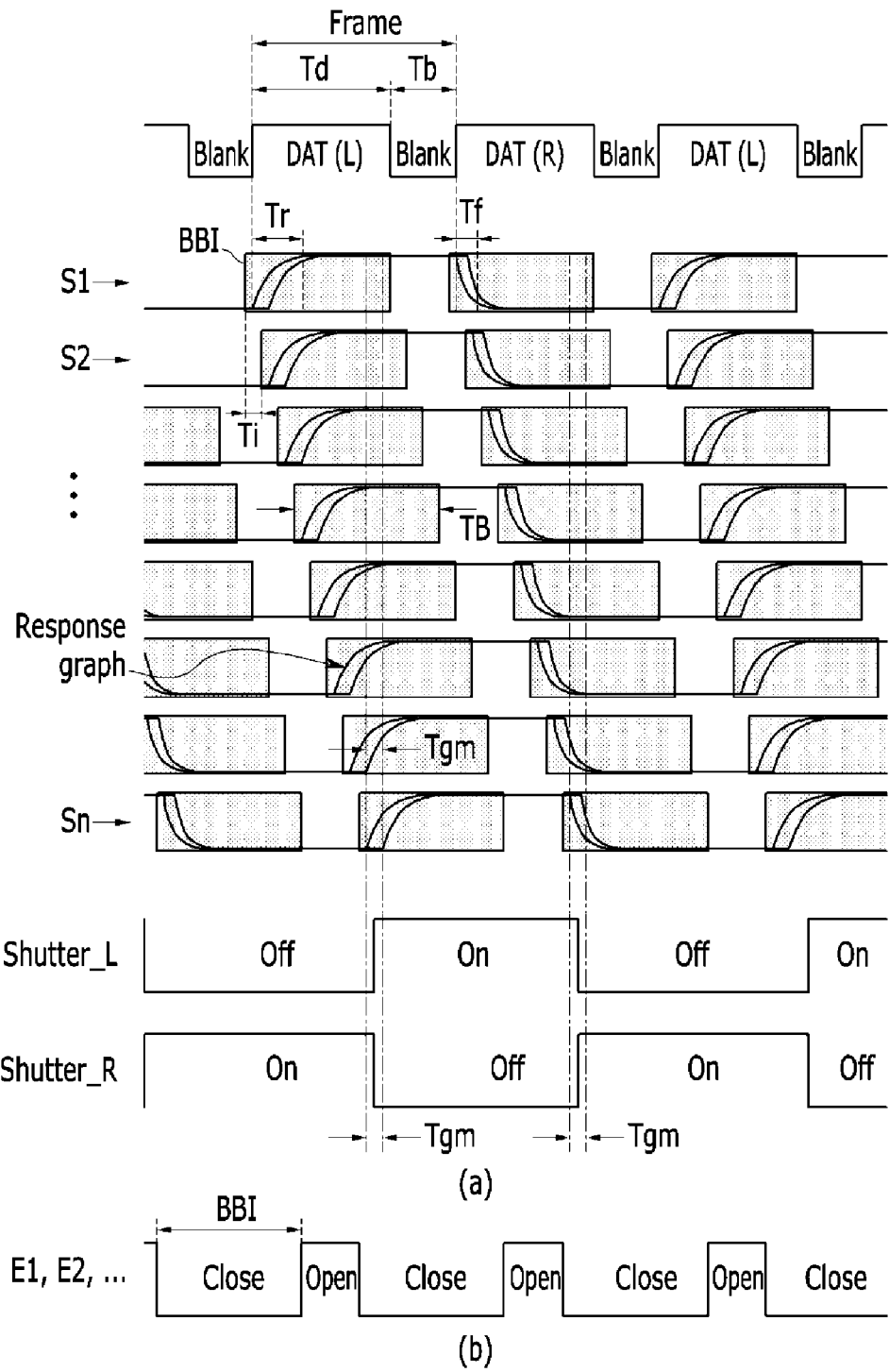
FIG. 15 is a timing view illustrating a driving method of a display device according to one or more embodiments of the present invention.

FIG. 14 is a view illustrating a method of operating the display panel and the barrier of the display device in two consecutive frames according to one or more embodiments of the present invention. FIG. 15 is a timing view illustrating a driving method of the display device according to one or more embodiments of the present invention.

The driving method of the display device illustrated by FIGS. 14 and 15 may include features similar to and features different from features of the driving method discussed with reference to FIGS. 9 and 10. In one or more embodiments, the mode selection information SEL inputted to the integration controller 700 may include stereoscopic 3D mode selection information for observing the 3D image using the shutter member 60. Accordingly, the entire pixel PX of the display panel 300 may alternately display the left eye image L and the right eye image R for each frame.

Referring to FIG. 14(*a*), the display panel 300 of the display device may display the right eye image R at the end of the first frame F(N).

In one or more embodiments, the same voltage may be applied to the first electrodes E1, E2, ..., and Em of the barrier 800, such that there may be substantially no regions divided according to the first electrodes E1, E2, ..., and Em. In one or more embodiments, the first electrode portion 110 (illustrated in FIG. 3) of the barrier 800 may include one electrode formed of an integrated plate instead of a plurality of first electrodes E1, E2, ..., and Em.

Next, referring to FIGS. 14(*b*) and 14(*c*), when the second frame F(N+1), which is the next frame immediately following the first frame F(N), starts, sequential scanning of the gate signal to the gate lines GL of the display panel 300 is performed from the top side in the second direction D2 to start to display the left eye image L, which is the image for the second frame F(N+1), from the top side. A frame boundary BN may be present between the images of the first frame F(N) and the second frame F(N+1) during the second frame F(N+1). Further, the display panel 300 includes a response transition region Ring in the course of changing the image of the first frame F(N) into the image of the second frame F(N+1) based on the frame boundary BN. The response transition region Ring may move in a moving direction that is consistent with the second direction D2.

Referring to FIG. 15, the section in which the response graph is changed, that is, the region corresponding to the first response time Tr and the second response time Tf, may correspond to the response transition region Ring according to the input of the image signal DAT.

When the response transition region Ring is present in the display panel 300, the barrier 800 includes (and/or displays) a barrier black section BBI corresponding to (and overlapping) the response transition region Ring. The barrier black section BBI may be positioned to correspond to the section in which the response graph of the display device is changed when one frame starts.

The duration time TB of the barrier black section BBI may be appropriately adjusted so as to cover the response transition region Ring to some degree. The barrier black section BBI of the barrier 800 blocks the response transition region Ring of the display panel 300 so as not to allow the observer to recognize the response transition region; accordingly, it is possible to prevent perceivable crosstalk. In one or more embodiments, the light source, such as the backlight of the liquid crystal display, may not be turned off for a predetermined time in order to prevent the response transition region Ring from being recognized but may be continuously turned on, satisfactory luminance of the image may be provided.

Referring to FIG. 15, the left eye shutter Shutter_L or the right eye shutter Shutter_R of the shutter member 60 may be in an open state "On" a predetermined time before an input time Td, during which the corresponding left eye image signal L or right eye image signal R is inputted to the pixel PX of the display panel 300, is finished or when the vertical blank period Blank starts.

When the state of the left eye shutter Shutter_L or the right eye shutter Shutter_R is changed from the closed state "Off" to the open state "On" or is reversely changed, a predetermined time may be required to completely change the on-off state by the shutter member 60; this time is called a switching time Tgm. In one or more embodiments, the time required for the left eye shutter Shutter_L or the right eye shutter Shutter_R of the shutter member 60 to start in a state and to completely change to be in a next state may be the switching time Tgm, and the switching time Tgm may be greater than 0. In one or more embodiments, the shutter of the shutter member 60 includes liquid crystal, the time required to completely close or open the left eye shutter Shutter_L or the right eye shutter Shutter_R may depend on the response speed of liquid crystal.

The image displayed (or perceived) through the shutter member 60 during the switching time Tgm may be a mixed image of the left eye image and the right eye image, causing crosstalk. In one or more embodiments, the entire region corresponding to all the second electrodes (or row electrodes) S1, S2, ..., and Sn may correspond to a blocking region so that the barrier 800 may display a barrier black section BBI that corresponds to the entire display area of the display panel 300 during the switching time Tgm, in order to prevent the crosstalk from being recognized. Substantially the entire barrier 800 may become a blocking region during the switching time Tgm, such that the eyes of the observer recognize the black and that the brain of the observer does not recognize the crosstalk caused by the slow response speed of the shutter member 60.

At least two of the second electrodes S1, S2, ..., and Sn may be driven with the same voltages so that the timing of the barrier black sections BBI for the at least two of the second electrodes S1, S2, ..., and Sn may be the same and thus the entire region corresponding to all the second electrodes S1, S2, ..., and Sn becomes a blocking region during the switching time Tgm.

The duration time TB of the barrier black section BBI for each of the second electrodes S1, S2, ..., and Sn may be longer than each of the first response time Tr and the second response time Tf, and the duration time TB of the barrier black section BBI may be appropriately adjusted so that the time during which the first second electrode S1 overlaps the barrier black section BBI and the time during which the last second electrode Sn overlaps the barrier black section BBI overlap each other (or have a non-zero overlap).

In the timing graph, sections between the barrier black sections BBI may correspond to a transmitting region to allow the image provided by the display panel 300 to substantially transmit through the barrier 800.

FIG. 15(b) illustrates a display state of the regions corresponding to one of the second electrodes S1, S2, ..., and Sn (e.g., the electrode Sn) and the first electrodes E1, E2, ..., and Em according to time. A transmitting region (open) corresponding to one of the second electrodes S1, S2, ..., and Sn and the entire first electrodes E1, E2, etc. may become a blocking region (closed) around the start of the next frame, wherein the blocking region corresponds to the barrier black section BBI. In one or more embodiments, the duration time TB of the barrier black section BBI may be the same as the duration time of one blocking region (closed). The interval of changing the states of the transmitting region (open) and the blocking region (closed) corresponding to the first electrodes E1, E2, ..., and Em, i.e., the sum of the duration of one transmitting region and the duration of one blocking region, may be one frame.

Next, referring to FIG. 14(d), when the scanning of the barrier black section BBI, which corresponds to the response transition region Ring and/or the frame boundary BN, is finished, substantially the entire display panel 300 may display the image of the second frame F(N+1), and substantially the entire region of the barrier 800 may be a transmitting region (open).

According to one or more embodiments of the present invention, two or more adjacent second electrodes of S1, S2, ..., and Sn may be driven simultaneously by one or more voltages having the same phase (and having the same value).

Figure 12:
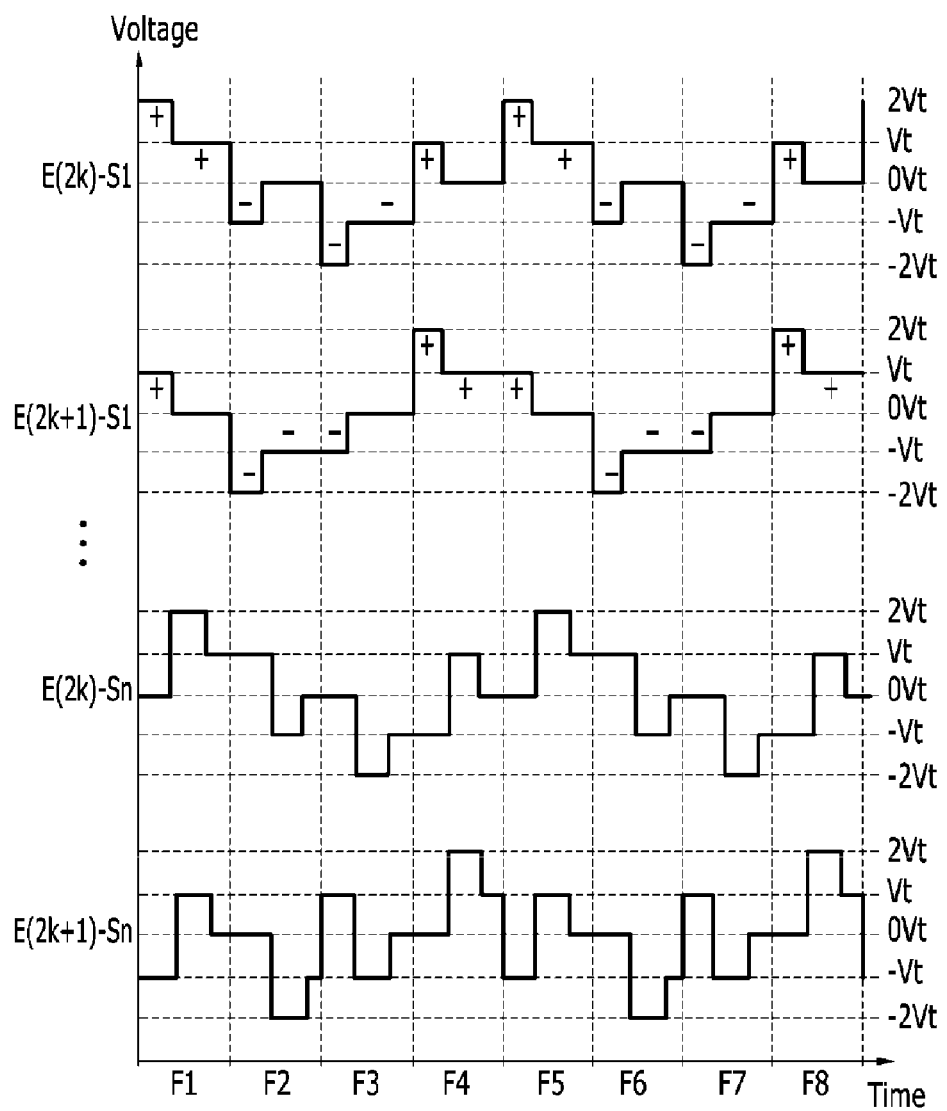
FIG. 12 is a timing view illustrating a voltage difference between electrodes included in a barrier of a display device according to one or more embodiments of the present invention.

The method of applying voltages to the first electrodes E1, E2, ..., and Em and the second electrodes S1, S2, ..., and Sn included in the barrier 800 associated with the examples of FIGS. 13, 14, and 15 may be similar to that of the aforementioned examples of FIGS. 11 and 12. Nevertheless, since the barrier 800 is not required to display blocking regions and transmitting regions alternately in the first direction D1, only one voltage is applied to the electrode(s) of the first electrode portion 110, and the voltages applied to the second electrodes S1, S2, ..., and Sn may have less than four levels, for example, three voltage levels.

Figure 16:
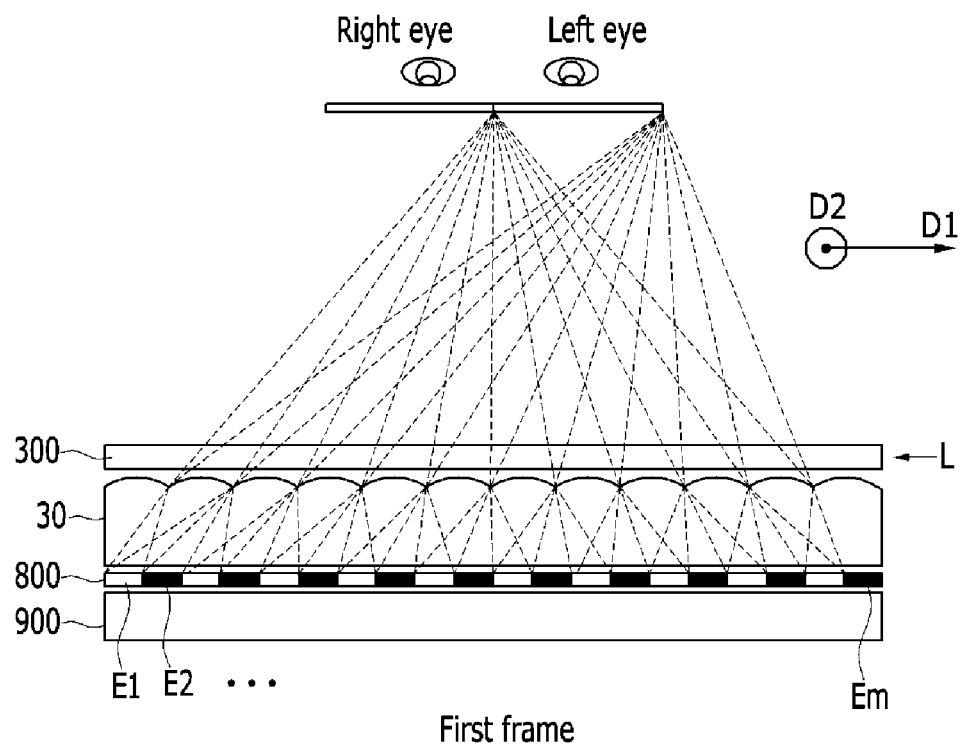
FIGS. 16 and 17 are schematic views illustrating a process for recognizing an image provided by a display device according to one or more embodiments of the present invention.
Figure 17:
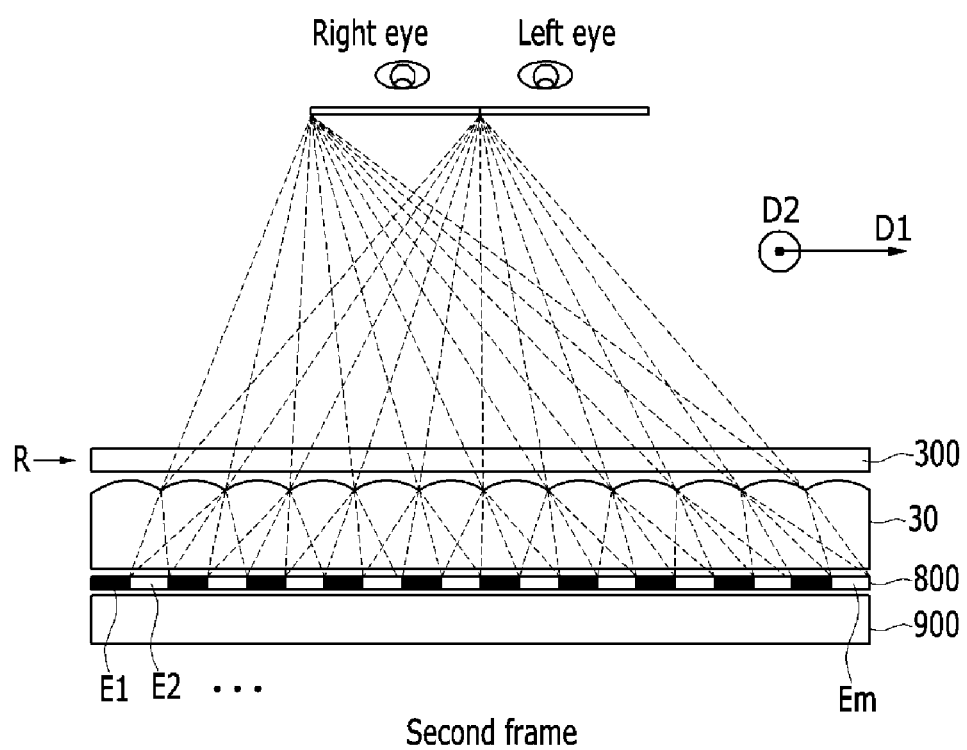

FIGS. 16 and 17 are schematic views illustrating a process for an observer to perceive an image provided by the display device in two consecutive frames according to one or more embodiments of the present invention.

The display device may be operated in the autostereoscopic 3D mode and in a light directing 3D mode. In one or more embodiments, the barrier 800 is positioned at a rear side of the display panel 300, such that the display panel 300 is positioned between the barrier 800 and the observer.

The display device may further include a backlight 900 and a lens portion 30 positioned at a rear side of the display panel 300. In one or more embodiments, the display panel 300 may be a display panel such as a liquid crystal display panel. The barrier 800 may be positioned between the lens portion 30 and the backlight 900, and the lens portion 30 may be positioned between the display panel 300 and the barrier 800. The lens portion 30 may include a plurality of convex lenses arranged along the first direction D1, and each convex lens may extend in the second direction D2.

Light emitted from the backlight 900 may pass through the barrier 800 and be selectively steered toward the left eye position or the right eye position of an observer through the lens portion 30.

Referring to FIG. 16, in the first frame, in the display panel 300, the barrier 800 for displaying the left eye image L may include transmitting regions (open) and blocking regions (closed) alternately arranged along the first direction D1, and each blocking region (close) and each transmitting region (open) may extend in the second direction D2, which is substantially vertical to the first direction D1. Each blocking region (closed) and each transmitting region (open) may correspond to at least one of the first electrodes E1, E2, ..., and Em of the barrier 800. In one or more embodiments, as illustrated in FIG. 16 and FIG. 17, each blocking region (closed) corresponds to one first electrode (i.e., one column electrode) of the barrier 800, and each transmitting region (open) corresponds to one first electrode (i.e., one column electrode) of the barrier 800.

In the first frame, light provided by the backlight 900 may pass through the barrier 800, and the left eye image L provided by the display panel 300 may be steered toward the left eye of an observer through the lens portion 30. Accordingly, the left eye of the observer may recognize the image corresponding to the left eye image signal L inputted to the display panel 300. As illustrated in FIG. 16, in the first frame, the left eye image (having a width indicated by two focal points) may be presented substantially within the view field of the left eye but substantially outside the view field of the right eye.

Next, in the second frame, which immediately follows the first frame, the display panel 300 may display the right eye image R, and the barrier 800 may change the transmitting regions (open) in the first frame into blocking regions (close) and may change the blocking regions (closed) in the first frame into transmitting regions (open).

In the second frame, light provided by the backlight 900 may pass through the barrier 800, and the right eye image R provided by the display panel 300 may be steered toward the right eye of the observer through the lens portion 30. Accordingly, the right eye of the observer may recognize the image corresponding to the right eye image signal R inputted to the display panel 300. As illustrated in FIG. 17, in the second frame, the right eye image (having a width indicated by two focal points) may be presented substantially within the view field of the right eye but substantially outside the view field of the left eye.

Accordingly, the brain of the observer may recognize the mixed image of the right eye image R and the left eye image L displayed in the two adjacent frames as a 3D image.

Figure 18:
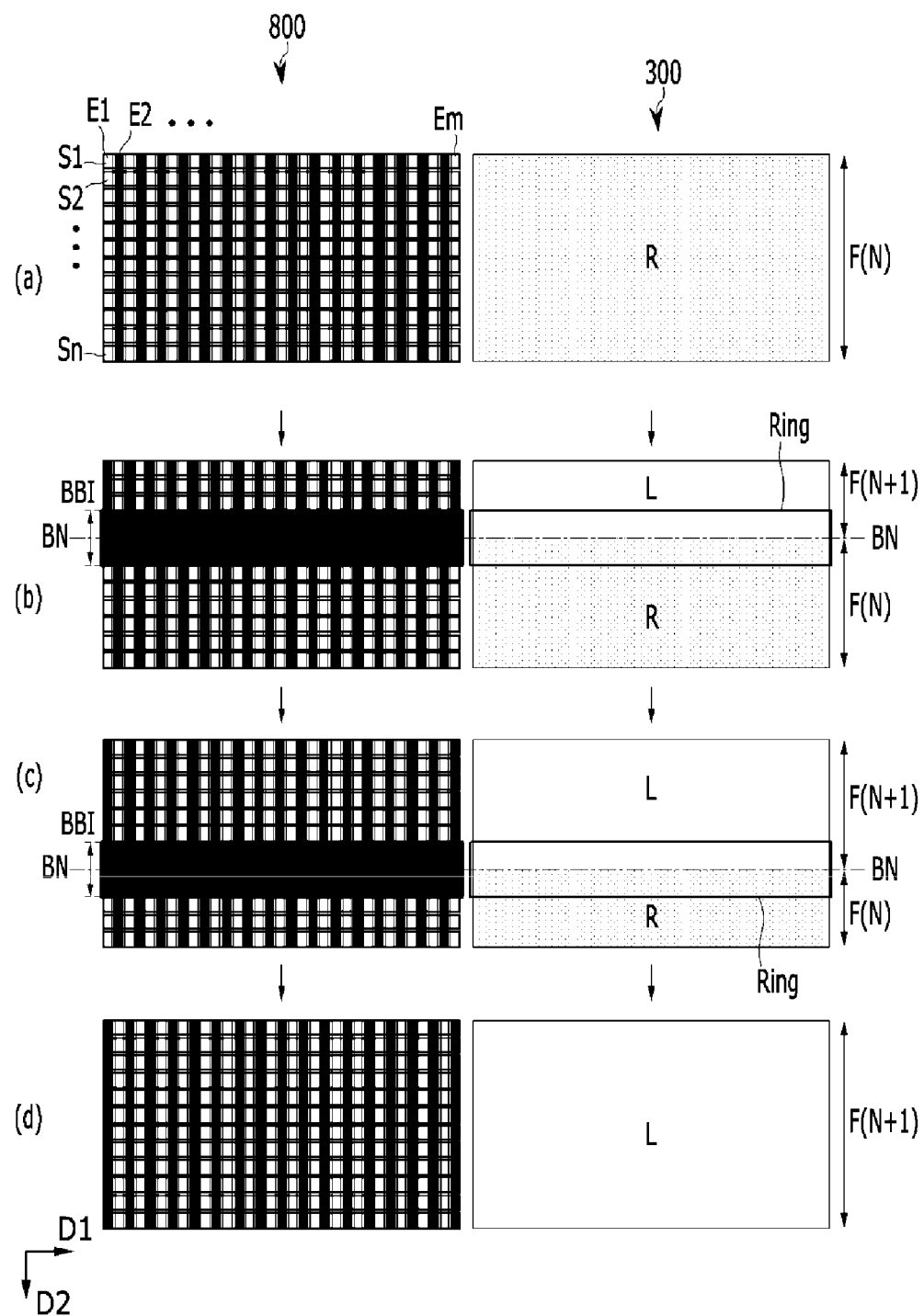
FIG. 18 is a view illustrating a method of operating a display panel and a barrier of the display device in two consecutive frames according to one or more embodiments of the present invention.

FIG. 18 is a view illustrating a method of operating the display panel and the barrier of the display device in two consecutive frames according to one or more embodiments of the present invention.

The driving method related to the examples of FIGS. 16, 17, and 18 may be similar to the driving method related to the examples of FIGS. 9 and 10. Nevertheless, since operation is performed in the directional 3D mode, methods of displaying the image using the display panel 300 may be different. Referring to FIG. 18, substantially all the pixels PX of the display panel 300 may display one of the left eye image L and the right eye image R during one frame (e.g., at the end of one frame).

In one or more embodiments, referring to FIG. 18(a), substantially the entire display panel 300 may be in a state where the right eye image R is displayed at the time when the first frame F(N) is just finished. Light provided from the backlight 900 may be steered (by the lens portion 30) toward the right eye of an observer through the barrier 800, which includes transmitting regions (open) and blocking regions (closed) alternately arranged along the first direction D1; accordingly, the right eye of the observer may recognize the right eye image R provided from the display panel 300. The "first" frame F(N) discussed with reference to FIG. 18 may represent the "second" frame discussed with reference to FIG. 17 and may be immediately followed by a frame for displaying a left eye image.

Next, referring to FIGS. 18(b) and 18(c), when the second frame F(N+1), which immediately follows the first frame F(N), starts, sequential supply of the gate signal to the gate lines GL (i.e., scanning) of the display panel 300 is performed in the second direction D2 to start to display the left eye image L, which is the image for the second frame F(N+1), from the top side. The frame boundary BN and the response transition region Ring may present at intermediate (or transition) times of the second frame F(N+1).

When the response transition region Ring is present in the display panel 300, the barrier 800 may display a barrier black section BBI corresponding to the response transition region Ring. The barrier black section BBI may appear to move in the second direction D2 from an upper end of the barrier 800, which corresponds to an upper end of the display panel 300. When the barrier black section BBI has moved past a portion of the barrier 800, in the portion of the barrier, transmitting regions (open) may change into blocking regions (closed), and the blocking regions (closed) may be change into transmitting regions (open). Accordingly, light provided from the backlight 900 may be steered toward the left eye of an observer through the portion of the barrier 800 and the lens portion 30, such that the left eye of the observer may recognize at least a portion of the left eye image L provided by the display panel 300.

In one or more embodiments, 3D images may be perceived without use of the shutter member 60 (illustrated in FIG. 13), and display defects, such as deterioration of transmittance and crosstalk, may be minimized.

One or more characteristics and effects discussed with reference to FIGS. 9 and 10 may be applied to the examples related to FIGS. 16, 17, and 18.

In one or more embodiments, the method of driving the first electrodes E1, E2, . . . , and Em and the second electrodes S1, S2, . . . , and Sn included in the barrier 800 related to the examples of FIGS. 16, 17, and 18 may be similar to the method discussed with reference to FIGS. 11 and 12.

Figure 19:
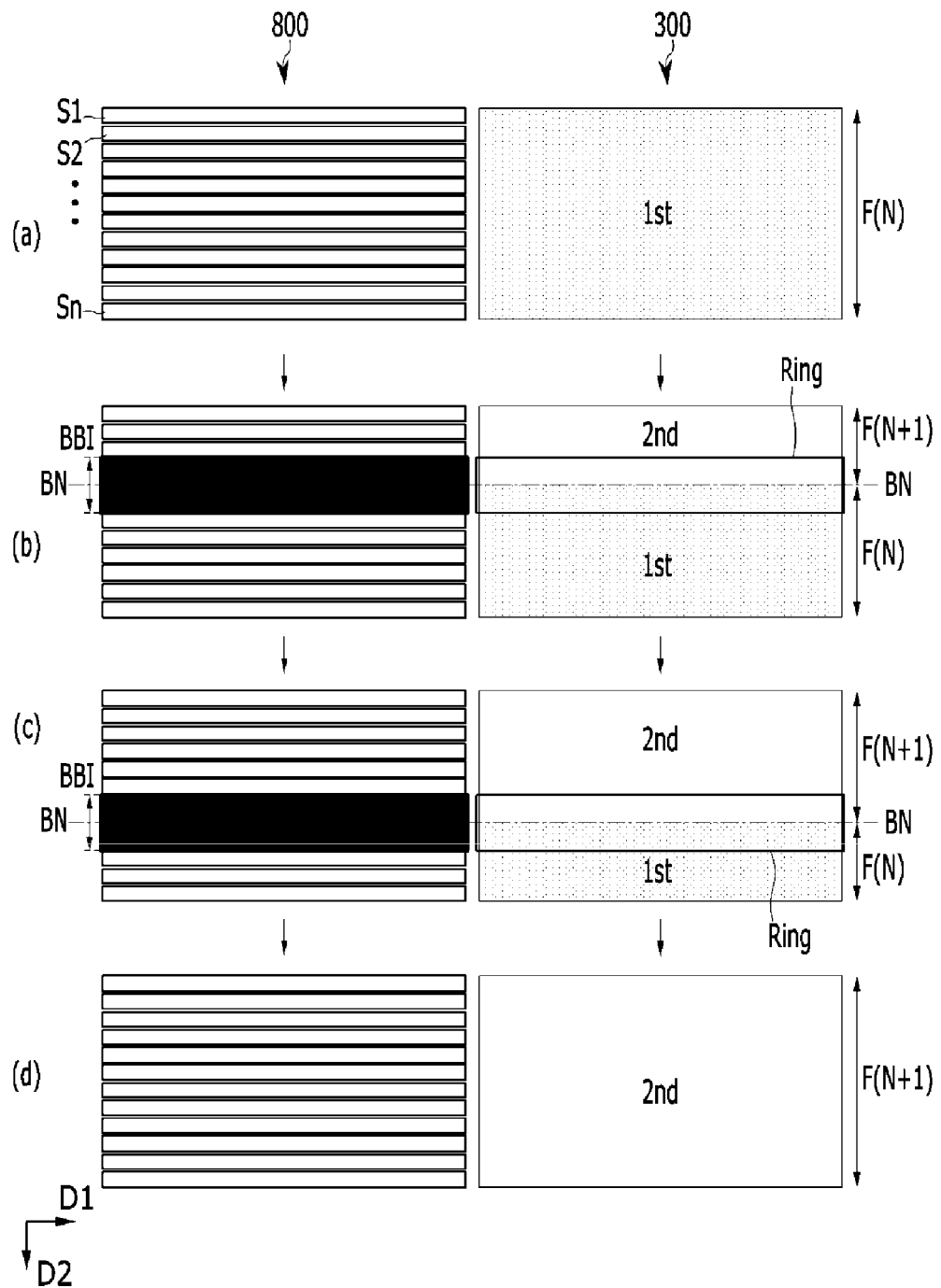
FIG. 19 is a view illustrating a method of operating a display panel and a barrier of a display device in two consecutive frames according to one or more embodiments of the present invention.

FIG. 19 is a view illustrating a method of operating the display panel and the barrier of the display device in two consecutive frames according to one or more embodiments of the present invention. FIG. 20 is a timing view illustrating a driving method of the display device according to one or more embodiments of the present invention.

In the display device, mode selection information SEL may include advanced 2D mode selection information to allow the observer to recognize a 2D image according to an advanced 2D mode method. In one or more embodiments, the barrier 800 may be positioned at a front side of the display panel 300, between the display panel 300 and an observer. The integration controller 700 may receive 2D image information from an external source and may transfer the 2D image information as an input image signal IDAT to the signal controller 600. Substantially all the pixels PX of the display panel 300 may display the 2D image for the corresponding frame.

Referring to FIG. 20(a), the image signal DAT may include the 2D image signals corresponding to the first image 1st, the second image 2nd, the third image 3rd, etc. sequentially displayed according to the frames. A vertical blank period Blank may be positioned between input periods of the image signals DAT of adjacent frames.

Referring to FIG. 19(a), substantially the entire display panel 300 of the display device may display the first image 1st corresponding to the first frame F(N) at the time when the first frame F(N) is just finished.

In one or more embodiments, the operation of the barrier 800 may be similar to the operation discussed with reference to FIG. 14. In one or more embodiments, the same voltage may be applied to the first electrodes E1, E2, . . . , and Em of the barrier 800, such that the first electrodes E1, E2, . . . , and Em may appear to be an integral electrode. In one or more embodiments, the first electrode portion 110 of the barrier 800 may include one electrode formed of an integrated plate instead of a plurality of first electrodes E1, E2, . . . , and Em.

Next, referring to FIGS. 19(b) and 19(c), when the second frame F(N+1), which immediately follows the first frame F(N), starts, sequential supply of the gate signal to the gate lines GL (i.e., scanning) of the display panel 300 is performed in the second direction D2 to start to display the second image 2nd of the second frame F(N+1) from the top side. Accordingly, the frame boundary BN may be present between the images of the first frame F(N) and the second frame F(N+1) at intermediate (or transition) times of the second frame F(N+1), and the response transition region Ring during which the image is changed from the first image 1st to the second image 2nd (corresponding to the frame boundary BN) is present in the display panel 300 and appears to move in the second direction D2. In one or more embodiments, the barrier 800 may display the barrier black section BBI corresponding to the response transition region Ring. The barrier black section BBI may move in the second direction D2 from an upper end of the barrier 800, which corresponds to an upper end of the display panel 300.

FIG. 20(a) shows the timing when the barrier black section BBI is displayed based on each of the second electrode S1, S2, . . . , and Sn. Referring to FIG. 20(a), the start of the duration time TB of displaying the barrier black section BBI using the first second electrode S1 (i.e., the first row electrode S1) may correspond to the start of the input of each image signal DAT.

The duration time TB of the barrier black section BBI, which is the time during which one of the second electrode S1, S2, . . . , and Sn is used for displaying the barrier black section BBI, may be longer than the first response time Tr (of the liquid crystal of the display panel 300) and the second response time Tf (of the liquid crystal of the display panel 300). In one or more embodiments, the duration time TB of the barrier black section BBI may be appropriately configured so that the response transition region Ring of the display panel 300 is at least covered (or overlapped) by the barrier black section BBI to some degree.

A region of the optical effect layer 130 corresponding to (or overlapping) second electrodes (or row electrodes) that do not currently correspond to the barrier black section BBI may be a transmitting region (open) of the optical effect layer 130. In a frame, the barrier black section BBI may be positioned between two transmitting regions of the optical effect layer 130.

FIG. 20(b) shows a display state of the regions corresponding to one of the second electrodes S1, S2, . . . , and Sn (e.g., the electrode Sn) and the first electrodes E1, E2, . . . , and Em according to time. A transmitting region (open) corresponding to one of the second electrodes S1, S2, . . . , and Sn and the entire first electrodes E1, E2, etc. may become a blocking region (closed) around the start of the next frame, wherein the blocking region corresponds to the barrier black section BBI. In one or more embodiments, the duration time TB of the barrier black section BBI may be the same as the duration time of one blocking region (closed). The interval of changing the states of the transmitting region (open) and the blocking region (closed) corresponding to the first electrodes E1, E2, . . . , and Em, i.e., the sum of the duration of one transmitting region and the duration of one blocking region, may be one frame.

Next, referring to FIG. 19(d), when the scanning of the barrier black section BBI, which corresponds to the response transition region Ring and/or the frame boundary BN, is finished, substantially the entire display panel 300 may display the second image 2nd, and substantially the entire region of the barrier 800 may be the transmitting region (open).

According to embodiments of the invention, when the response transition region Ring around the frame boundary BN of the display panel 300 is blocked by the barrier black section BBI of the barrier 800. Advantageously, embodiments of the invention may substantially prevent a perceivable crosstalk between the images associated with two consecutive frames (when a motion picture is displayed). In one or more embodiments, since the light source, such as the backlight of a liquid crystal display, may not be turned off for a predetermined time in order to prevent the response transition region Ring from being recognized, but may remain turned on, satisfactory luminance of the image may be provided.

In one or more embodiments, the duration time Tb of the vertical blank period may be about 30% or more of one frame in order to prevent the boundaries between light-blocking portions of the optical effect layer 130 corresponding to the second electrodes S1, S2, . . . , and Sn from being recognized.

The method of applying voltages to the first electrodes E1, E2, . . . , and Em and the second electrodes 51, S2, . . . , and Sn included in the barrier 800 associated with the examples of FIGS. 19 and 20 may be similar to that of the aforementioned examples of FIGS. 11 and 12. Nevertheless, since the barrier 800 is not required to display blocking regions and transmitting region alternately in the first direction D1, only one voltage may be applied to the electrode(s) of the first electrode portion 110, and the voltages applied to the second electrodes 51, S2, . . . , and Sn may have three different voltage levels.

In one or more embodiments, the barrier driver 850 and/or the display panel driver 350 may determine whether a static image or a motion picture is to be displayed by the display panel 30. If a static image is to be displayed (and/or if a general 2D mode is selected), the entire region of the barrier 800 is maintained in a transmitting state and does not include the barrier black section BBI.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | | | |
|---|---|---|---|
| 30: | Lens portion | 60: | Shutter member |
| 65: | Shutter member controller | 110: | First electrode portion |
| 120: | Second electrode portion | 130: | Optical effect layer |
| 300: | Display panel | 350: | Display panel driver |
| 400: | Gate driver | 500: | Data driver |
| 600: | Signal controller | 700: | Integration controller |
| 800: | Barrier | 850: | Barrier driver |
| 851, 852: | Electrode driver | 900: | Backlight |

What is claimed is:

1. A display device comprising:
a display panel including a plurality of pixels arranged in a first direction and a second direction that is substantially vertical to the first direction,
a display panel driver scanning an image signal of one frame in the second direction to input the image signal to the plurality of pixels,
a barrier including a first electrode portion and a second electrode portion facing each other and overlapping the display panel, and
a barrier driver driving the barrier,
wherein the second electrode portion includes a plurality of second electrodes each extending in the first direction and arranged in the second direction, and
when a boundary between an image of a first frame and an image of a second frame is referred to as a frame boundary when the image of the first frame and the image of the second frame that is next to the first frame are displayed at the same time in the display panel, the barrier driver drives the barrier so that the barrier includes a barrier black section which corresponds to the frame boundary and is scanned in the second direction.

2. The display device of claim 1, wherein:
a scanning interval of the barrier black section is less than about 0.5 ms.

3. The display device of claim 2, wherein:
a vertical blank period is positioned between input periods of the image signals of two adjacent frames, and
a duration time of the vertical blank period is about 30% or more of one frame.

4. The display device of claim 3, wherein:
the barrier black section corresponds to one or more adjacent second electrodes of the plurality of second electrodes.

5. The display device of claim 4, wherein:
a polarity of a voltage difference between a second electrode displaying the barrier black section and the first electrode portion is reversed every frame.

6. The display device of claim 5, wherein:
the first electrode portion includes a plurality of first electrodes each extending in the second direction and arranged in the first direction, and
the barrier includes a blocking region and a transmitting region alternately arranged in the first direction.

7. The display device of claim 6, wherein:
the barrier is positioned between the display panel and an observer,
the display panel displays a left eye image and a right eye image alternately in the first direction, and
when the barrier is divided into a first region and a second region with respect to the barrier black section, arrangement of the blocking region and the transmitting region in the first region is opposite to arrangement of the blocking region and the transmitting region in the second region.

8. The display device of claim 7, wherein:
a voltage applied to an even numbered first electrode of the plurality of first electrodes has a waveform that is reversed to a waveform of a voltage applied to an odd numbered first electrode.

9. The display device of claim 8, wherein:
a number of levels of a voltage applied to the second electrode is four or more.

10. The display device of claim 9, wherein:
a voltage difference between a voltage applied to an even numbered first electrode among the first electrodes overlapping the second electrode displaying the barrier black section and a voltage applied to the second electrode displaying the barrier black section and a voltage difference between a voltage applied to an odd numbered first electrode among the first electrodes overlapping the second electrode displaying the barrier black section and a voltage applied to the second electrode displaying the barrier black section are different from each other.

11. The display device of claim 6, further comprising:
a backlight providing light to the display panel, and
a lens positioned between the backlight and the display panel,
wherein the barrier is positioned between the lens and the backlight,
the display panel displays a right eye image in the first frame and displays a left eye image in the second frame, and
the barrier and the lens steer light of the backlight toward a right eye of an observer in the first frame, and steer light of the backlight toward a left eye of the observer in the second frame.

12. The display device of claim 11, wherein:
a voltage applied to the first electrode portion is constant, and a number of levels of a voltage applied to the second electrode is three.

13. The display device of claim 5, further comprising:
a shutter member that can alternately block a left eye and a right eye of an observer,
wherein the barrier is positioned between the display panel and the observer, and
the display panel displays a right eye image in the first frame and displays a left eye image in the second frame.

14. The display device of claim 13, wherein:
an entire region of the barrier corresponds to the barrier black section during a switching time in which a on-off state of a shutter included in the shutter member is changed.

15. The display device of claim 14, wherein:
a voltage applied to the first electrode portion is constant, and a number of levels of a voltage applied to the second electrode is three.

16. The display device of claim 5, wherein:
the barrier is positioned between the display panel and the observer, and
the display panel displays a 2-dimensional image.

17. A driving method of a display device including a display panel including a plurality of pixels arranged in a first direction and a second direction that is substantially vertical to the first direction and a barrier overlapping the display panel, the method comprising:
after displaying an image of a first frame, displaying an image of a second frame that is next to the first frame in the plurality of pixels by scanning in the second direction, and
wherein when a boundary between the image of the first frame and the image of the second frame is referred to as a frame boundary, the barrier displays a barrier black section which corresponds to the frame boundary and is scanned in the second direction.

18. The driving method of a display device of claim 17, wherein:
the barrier includes a first electrode portion and a second electrode portion facing each other, and
the second electrode portion includes a plurality of second electrodes each extending in the first direction and arranged in the second direction.

19. The driving method of a display device of claim 18, wherein:
a scanning interval of the barrier black section is less than about 0.5 ms.

20. The driving method of a display device of claim 19, wherein:
a vertical blank period is positioned between input periods of the image signals of two adjacent frames, and
a duration time of the vertical blank period is about 30% or more of one frame.

21. The driving method of a display device of claim 20, wherein:
a polarity of a voltage difference between a second electrode displaying the barrier black section and the first electrode portion is reversed every frame.

* * * * *